US009193883B2

(12) United States Patent
Keoshkerian et al.

(10) Patent No.: US 9,193,883 B2
(45) Date of Patent: Nov. 24, 2015

(54) PHASE CHANGE INK CONTAINING POLYESTER FOR IMPROVED IMAGE ROBUSTNESS

(71) Applicant: Xerox Corporation, Norwalk, CT (US)

(72) Inventors: Barkev Keoshkerian, Thornhill (CA); Valerie M. Farrugia, Oakville (CA); Jenny Eliyahu, Maple (CA); Gordon Sisler, St. Catharines (CA); Biby Esther Abraham, Mississauga (CA); Stephan V. Drappel, Toronto (CA)

(73) Assignee: Xerox Corporation, Norwalk, CT (US)

( * ) Notice: Subject to any disclaimer, the term of this patent is extended or adjusted under 35 U.S.C. 154(b) by 244 days.

(21) Appl. No.: 13/920,831

(22) Filed: Jun. 18, 2013

(65) Prior Publication Data

US 2014/0368588 A1    Dec. 18, 2014

(51) Int. Cl.
| | |
|---|---|
| *C09D 11/00* | (2014.01) |
| *B41J 2/175* | (2006.01) |
| *C09D 11/34* | (2014.01) |
| *B41J 2/21* | (2006.01) |
| *C09D 11/104* | (2014.01) |

(52) U.S. Cl.
CPC ............ *C09D 11/34* (2013.01); *B41J 2/17593* (2013.01); *B41J 2/2107* (2013.01); *C09D 11/104* (2013.01)

(58) Field of Classification Search
CPC .... B41J 2/17593; B41J 2/2107; C09D 11/34; C09D 11/104
USPC ............... 347/88, 95–100; 106/31.29–31.31, 106/31.61–31.63
See application file for complete search history.

(56) References Cited

U.S. PATENT DOCUMENTS

| | | |
|---|---|---|
| 4,490,731 A | 12/1984 | Vaught |
| 4,889,560 A | 12/1989 | Jaeger et al. |
| 4,889,761 A | 12/1989 | Titterington et al. |
| 5,195,430 A | 3/1993 | Rise |
| 5,221,335 A | 6/1993 | Williams et al. |
| 5,372,852 A | 12/1994 | Titterington et al. |
| 5,389,958 A | 2/1995 | Bui et al. |
| 5,959,066 A | 9/1999 | Charbonneau et al. |
| 6,025,061 A | 2/2000 | Khanarian et al. |
| 6,063,464 A | 5/2000 | Charbonneau et al. |
| 6,071,986 A | 6/2000 | Everhardus et al. |
| 6,107,447 A | 8/2000 | Kreuder et al. |
| 6,547,380 B2 | 4/2003 | Smith et al. |

(Continued)

OTHER PUBLICATIONS

Valeria Farrugia, et al., U.S. Appl. No. 13/718,424, filed Dec. 18, 2012, not yet published.

(Continued)

*Primary Examiner* — Matthew Luu
*Assistant Examiner* — Rut Patel
(74) *Attorney, Agent, or Firm* — Marylou J. Lavoie, Esq. LLC

(57) ABSTRACT

A phase change ink composition including an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant. A process including (1) incorporating into an ink jet printing apparatus the phase change ink composition; (2) melting the ink; and (3) causing droplets of the melted ink to be ejected in an imagewise pattern onto a substrate. An ink jet printer stick or pellet including the phase change ink composition.

20 Claims, 1 Drawing Sheet

(56) References Cited

U.S. PATENT DOCUMENTS

| | | |
|---|---|---|
| 6,593,049 B1 | 7/2003 | Veregin et al. |
| 6,756,176 B2 | 6/2004 | Stegamat et al. |
| 6,830,860 B2 | 12/2004 | Sacripante et al. |
| 7,973,186 B1 | 7/2011 | Goredema et al. |
| 8,287,632 B1 | 10/2012 | Morimitsu et al. |
| 8,372,189 B2 | 2/2013 | Chopra et al. |
| 8,500,896 B2 | 8/2013 | Morimitsu et al. |
| 8,506,040 B2 | 8/2013 | Belelie et al. |
| 2007/0015075 A1 | 1/2007 | Vijayendran et al. |
| 2008/0145775 A1 | 6/2008 | Vijayendran et al. |
| 2012/0086761 A1* | 4/2012 | Chr Tien et al. ........ 347/88 |
| 2012/0274699 A1 | 11/2012 | Belelie et al. |
| 2012/0274700 A1* | 11/2012 | Belelie et al. ........ 347/20 |
| 2013/0245197 A1 | 9/2013 | Faucher et al. |
| 2013/0284056 A1 | 10/2013 | Chopra et al. |
| 2013/0284057 A1 | 10/2013 | Belelie et al. |
| 2013/0284058 A1 | 10/2013 | Morimitsu et al. |
| 2013/0284060 A1 | 10/2013 | Morimitsu et al. |
| 2013/0284062 A1 | 10/2013 | Morimitsu et al. |

OTHER PUBLICATIONS

Naveen Chopra, et al., U.S. Appl. No. 13/847,116, filed Mar. 19, 2013, not yet published.

* cited by examiner

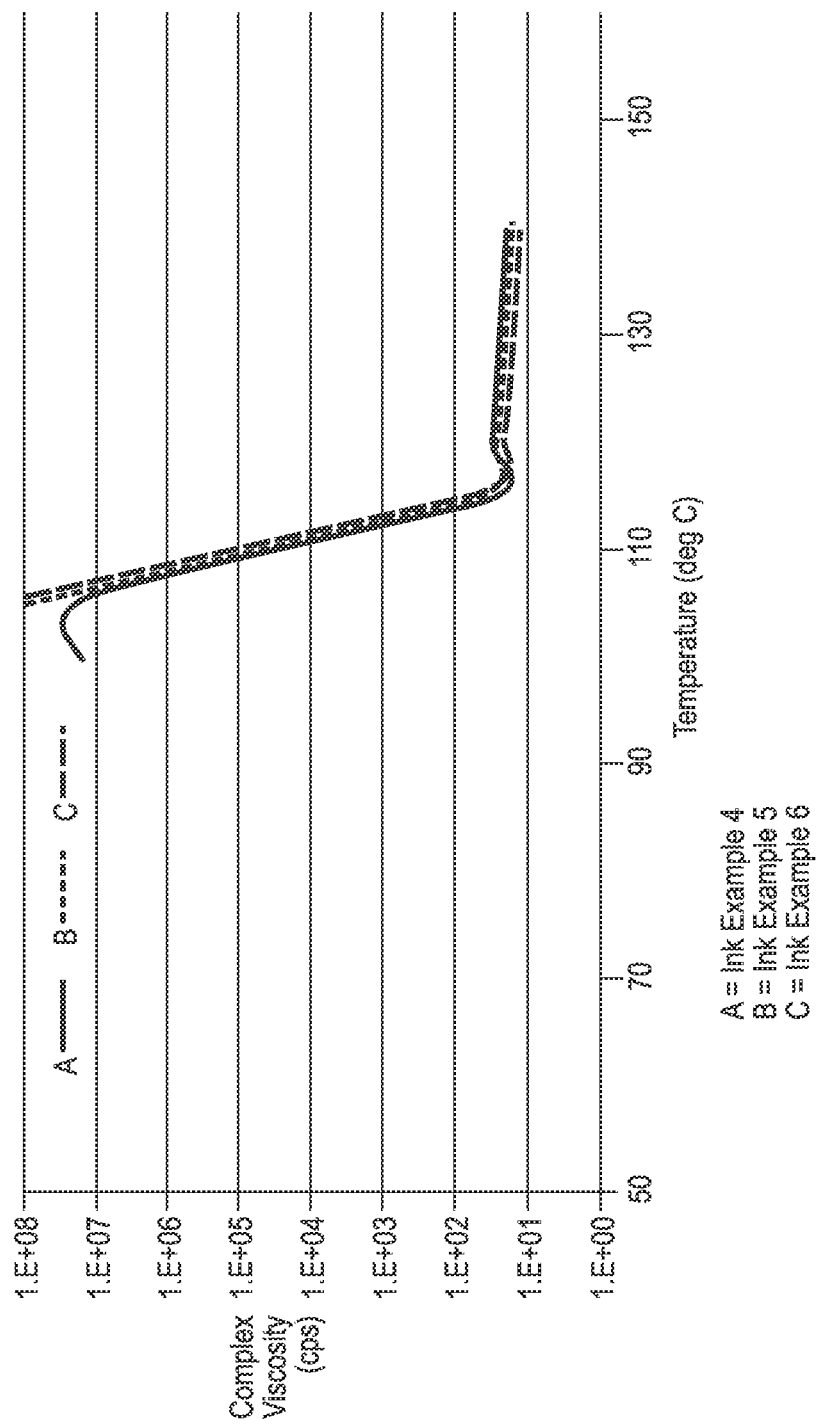

PHASE CHANGE INK CONTAINING POLYESTER FOR IMPROVED IMAGE ROBUSTNESS

BACKGROUND

Disclosed herein is a phase change ink composition providing improved printed image robustness. More particularly, disclosed herein is a phase change ink composition comprising an amorphous compound, a crystalline compound, a polyester polymer wherein the polyester has a molecular weight of from about 500 to about 8,000 and a polydispersity index of from about 1.0 to about 8.0, an optional synergist, an optional dispersant, and a colorant.

In general, phase change inks (sometimes referred to as solid inks or "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops. Phase change inks have also been used in other printing technologies, such as gravure printing.

Phase change inks for color printing typically comprise a phase change ink carrier composition which is combined with a phase change ink compatible colorant. In a specific embodiment, a series of colored phase change inks can be formed by combining ink carrier compositions with compatible subtractive primary colorants. The subtractive primary colored phase change inks can comprise four component dyes, namely, cyan, magenta, yellow and black, although the inks are not limited to these four colors. These subtractive primary colored inks can be formed by using a single dye or a mixture of dyes. For example, magenta can be obtained by using a mixture of Solvent Red Dyes or a composite black can be obtained by mixing several dyes. U.S. Pat. No. 4,889,560, U.S. Pat. No. 4,889,761, and U.S. Pat. No. 5,372,852, the disclosures of each of which are totally incorporated herein by reference, teach that the subtractive primary colorants employed can comprise dyes from the classes of Color Index (C.I.) Solvent Dyes, Disperse Dyes, modified Acid and Direct Dyes, and Basic Dyes.

The colorants can also include pigments, as disclosed in, for example, U.S. Pat. No. 5,221,335, the disclosure of which is totally incorporated herein by reference.

Phase change inks are desirable for ink jet printers because they remain in a solid phase at room temperature during shipping, long term storage, and the like. In addition, the problems associated with nozzle clogging as a result of ink evaporation with liquid ink jet inks are largely eliminated, thereby improving the reliability of the ink jet printing. Further, in phase change ink jet printers wherein the ink droplets are applied directly onto the final recording substrate (for example, paper, transparency material, and the like), the droplets solidify immediately upon contact with the substrate, so that migration of ink along the printing medium is prevented and dot quality is improved.

Ink jetting devices are known in the art, and thus extensive description of such devices is not required herein. As described in U.S. Pat. No. 6,547,380, which is hereby incorporated herein by reference in its entirety, ink jet printing systems generally are of two types: continuous stream and drop-on-demand. In continuous stream ink jet systems, ink is emitted in a continuous stream under pressure through at least one orifice or nozzle. The stream is perturbed, causing it to break up into droplets at a fixed distance from the orifice. At the break-up point, the droplets are charged in accordance with digital data signals and passed through an electrostatic field that adjusts the trajectory of each droplet in order to direct it to a gutter for recirculation or a specific location on a recording medium. In drop-on-demand systems, a droplet is expelled from an orifice directly to a position on a recording medium in accordance with digital data signals. A droplet is not formed or expelled unless it is to be placed on the recording medium.

There are at least three types of drop-on-demand ink jet systems. One type of drop-on-demand system is a piezoelectric device that has as its major components an ink filled channel or passageway having a nozzle on one end and a piezoelectric transducer near the other end to produce pressure pulses. Another type of drop-on-demand system is known as acoustic ink printing. As is known, an acoustic beam exerts a radiation pressure against objects upon which it impinges. Thus, when an acoustic beam impinges on a free surface (i.e., liquid/air interface) of a pool of liquid from beneath, the radiation pressure which it exerts against the surface of the pool may reach a sufficiently high level to release individual droplets of liquid from the pool, despite the restraining force of surface tension. Focusing the beam on or near the surface of the pool intensifies the radiation pressure it exerts for a given amount of input power. Still another type of drop-on-demand system is known as thermal ink jet, or bubble jet, and produces high velocity droplets. The major components of this type of drop-on-demand system are an ink filled channel having a nozzle on one end and a heat generating resistor near the nozzle. Printing signals representing digital information originate an electric current pulse in a resistive layer within each ink passageway near the orifice or nozzle, causing the ink vehicle (usually water) in the immediate vicinity to vaporize almost instantaneously and create a bubble. The ink at the orifice is forced out as a propelled droplet as the bubble expands.

In a typical design of a piezoelectric ink jet device utilizing phase change inks printing directly on a substrate or on an intermediate transfer member, such as the one described in U.S. Pat. No. 5,372,852, which is hereby incorporated herein by reference in its entirety, the image is applied by jetting appropriately colored inks during four to eighteen rotations (incremental movements) of a substrate (an image receiving member or intermediate transfer member) with respect to the ink jetting head, i.e., there is a small translation of the print head with respect to the substrate in between each rotation. This approach simplifies the print head design, and the small movements ensure good droplet registration. At the jet operating temperature, droplets of liquid ink are ejected from the printing device and, when the ink droplets contact the surface of the recording substrate, either directly or via an intermediate heated transfer belt or drum, they quickly solidify to form a predetermined pattern of solidified ink drops.

As noted, ink jet printing processes may employ inks that are solid at room temperature and liquid at elevated temperatures. For example, U.S. Pat. No. 4,490,731, which is hereby incorporated by reference herein, discloses an apparatus for dispensing solid ink for printing on a substrate such as paper. In thermal ink jet printing processes employing hot melt inks, the solid ink is melted by the heater in the printing apparatus and utilized (i.e., jetted) as a liquid in a manner similar to that of conventional thermal ink jet printing. Upon contact with the printing substrate, the molten ink solidifies rapidly, enabling the colorant to substantially remain on the surface of the substrate instead of being carried into the substrate (for example, paper) by capillary action, thereby enabling higher print density than is generally obtained with liquid inks. Advantages of a phase change ink in ink jet printing are thus elimination of potential spillage of the ink during handling, a wide range of print density and quality, minimal paper cockle or distortion, and enablement of indefinite periods of non-printing without the danger of nozzle clogging, even without capping the nozzles.

Examples of the phase change inks herein are inks that include an ink vehicle that is solid at temperatures of about 23° C. to about 27° C., for example room temperature, and specifically are solid at temperatures below about 60° C. However, the inks change phase upon heating, and are in a molten state at jetting temperatures. Thus, the inks have a viscosity of from about 1 to about 20 centipoise (cp), for example from about 5 to about 15 cp or from about 8 to about 12 cp, at an elevated temperature suitable for ink jet printing, for example temperatures of from about 60° C. to about 150° C.

In this regard, the inks herein may be either low energy inks or high energy inks. Low energy inks are solid at a temperature below about 40° C. and have a viscosity of from about 1 to about 20 centipoise such as from about 5 to about 15 centipoise, for example from about 8 to about 12 cp, at a jetting temperature of from about 60° C. to about 100° C. such as about 80° C. to about 100° C., for example from about 90° C. to about 100° C. High energy inks are solid at a temperature below 40° C. and have a viscosity of from about 5 to about 15 centipoise at a jetting temperature of from about 100° C. to about 180° C., for example from 120° C. to about 160° C. or from about 125° C. to about 150° C.

Crystalline-amorphous inks have been described which display improved robustness over previous inks, particularly on coated substrates, and particularly with respect to scratch, fold and fold offset.

U.S. Patent Publication 2012/0274699, U.S. patent application Ser. No. 13/095,636, entitled "Solid Ink Compositions Comprising Crystalline-Amorphous Mixtures", which is hereby incorporated by reference herein in its entirety, describes a solid ink composition comprising an amorphous component, a crystalline component, and optionally a colorant. In embodiments, the inks displayed improved robustness on coated substrates with respect to scratch, fold and fold offset over prior inks.

While currently available phase change inks are suitable for their intended purposes, a need remains for improved materials that can provide improved performance characteristics including improved image robustness such as improved scratch resistance, improved mail rub, improved resistance to smear, and improved mail offset. There further remains a need for phase change inks that can include polymeric materials while still exhibiting a suitable viscosity at jetting temperature.

The appropriate components and process aspects of the each of the foregoing U.S. Patents and Patent Publications may be selected for the present disclosure in embodiments thereof. Further, throughout this application, various publications, patents, and published patent applications are referred to by an identifying citation. The disclosures of the publications, patents, and published patent applications referenced in this application are hereby incorporated by reference into the present disclosure to more fully describe the state of the art to which this invention pertains.

SUMMARY

Described is a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant.

Also described is a process comprising (1) incorporating into an ink jet printing apparatus a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant; (2) melting the ink; and (3) causing droplets of the melted ink to be ejected in an imagewise pattern onto a substrate.

Also described is an ink jet printer stick or pellet including a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant.

BRIEF DESCRIPTION OF THE DRAWINGS

FIG. 1 is a graph showing complex viscosity (y-axis, centipoise) versus temperature (x-axis, ° C.) for inks prepared in accordance with the present disclosure.

DETAILED DESCRIPTION

A phase change ink composition is described comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant. A process is also described comprising (1) incorporating into an ink jet printing apparatus a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant; (2) melting the ink; and (3) causing droplets of the melted ink to be ejected in an imagewise pattern onto a substrate. An ink jet printer stick or pellet is also described including a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant.

Polyester Polymer.

Previously, polymeric additives have not been successfully included in phase change inks. Certain polymers, in particular polyester polymers, have not been selected for phase change ink compositions because such polymers have problematically imparted too high of a viscosity to the inks thus making jetting difficult or not possible. The present phase change ink compositions include polyester polymer wherein the polyester has a molecular weight of from about 500 to about 8,000 and a polydispersity index of from about 1.0 to about 8.0 in combination with amorphous and crystalline compounds.

In embodiments, the polyester selected herein can include those described in U.S. Pat. No. 6,593,049 and U.S. Pat. No. 6,756,176, which are each hereby incorporated by reference herein in their entireties. Suitable polyesters can include a mixture of an amorphous polyester resin and a crystalline polyester resin as described in U.S. Pat. No. 6,830,860, which is hereby incorporated by reference herein in its entirety.

For forming a crystalline polyester, one or more polyol branching monomers can be reacted with a diacid in the presence of an optional catalyst and a further organic diol suitable for forming the crystalline resin including aliphatic diols having from about 2 to about 36 carbon atoms, such as 1,2-ethanediol, 1,3-propanediol, 1,4-butanediol, 1,5-pentanediol, 2,2-dimethylpropane-1,3-diol, 1,6-hexanediol, 1,7-heptanediol, 1,8-octanediol, 1,9-nonanediol, 1,10-decanediol, 1,12-dodecanediol, and mixtures and combinations thereof, including their structural isomers. The aliphatic diol may be present in any suitable or desired amount, such as from about 25 to about 60 mole percent, or from about 25 to about 55 mole percent, or from about 25 to about 53 mole percent of the resin. In embodiments, a third diol can be selected from the above-described diols in an amount of from about 0 to about 25 mole percent, or from about 1 to about 10 mole percent of the resin.

Examples of organic diacids or diesters including vinyl diacids or vinyl diesters that can be selected for the preparation of the crystalline resin include oxalic acid, succinic acid, glutaric acid, adipic acid, suberic acid, azelaic acid, sebacic acid, fumaric acid, dimethyl fumarate, dimethyl itaconate, cis-1,4-diacetoxy-2-butene, diethyl fumarate, diethyl maleate, phthalic acid, isophthalic acid, terephthalic acid, naphthalene-2,6-dicarboxylic acid, naphthalene-2,7-dicarboxylic acid, cyclohexane dicarboxylic acid, malonic acid, mesaconic acid, a diester or anhydride thereof, and mixtures and combinations thereof. The organic diacid can be present in any suitable or desired amount, in embodiments, from about 25 to about 60 mole percent, or from about 25 to about 52 mole percent, or from about 25 to about 50 mole percent. In embodiments, a second diacid can be selected from the above-described diacids and can be present in an amount of from about 0 to about 25 mole percent of the resin.

For forming crystalline polyester, one or more polyacid branching monomers can be reacted with a diol in the presence of an optional catalyst and a further organic diacid or diester. The components can be selected in any suitable or desired ratio. In embodiments, the branching monomer can be provided in an amount of from about 0.1 to about 15 mole percent, or from about 1 to about 10 mole percent, or from about 2 to about 5 mole percent, and, in embodiments, a second branching monomer can be selected in any suitable or desired amount, in embodiments, from about 0 to about 10 mole percent, or from about 0.1 to about 10 mole percent of the robust resin.

Examples of diacids or diesters suitable for use in forming the resin herein include vinyl diacids or vinyl diesters used for the preparation of amorphous polyester resins including dicarboxylic acids or diesters such as terephthalic acid, phthalic acid, isophthalic acid, fumaric acid, trimellitic acid, dimethyl fumarate, dimethyl itaconate, cis-1,4-diacetoxy-2-butene, diethyl fumarate, diethyl maleate, maleic acid, succinic acid, itaconic acid, succinic acid, succinic anhydride, dodecylsuccinic acid, dodecylsuccinic anhydride, lutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethladipate, dimethyl dodecylsuccinate, and mixtures and combinations thereof.

The organic diacid or diester may be present in any suitable or desired amount, such as from about 35 to about 60 mole percent of the resin, or from about 42 to about 52 mole percent of the resin, or from about 45 to about 50 mole percent of the resin.

Examples of diols which may be used to prepared the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis (2-hydroxyethyl)oxide, dipropylene glycol, dibutylene, and mixtures and combinations thereof.

The organic diol can be present in any suitable or desired amount, such as from about 35 to about 60 mole percent of the resin, or from about 42 to about 55 mole percent of the resin, or from about 45 to about 53 mole percent of the resin.

In certain embodiments, the polyester can be a bio-based polyester. The bio-based polyester can be a bio-based amorphous polyester, a bio-based crystalline polyester, or a combination of bio-based amorphous polyester and bio-based crystalline polyester. In embodiments, the polyester is a bio-based crystalline polyester.

Examples of amorphous bio-based polymeric resins which may be utilized include polyesters derived from monomers including a fatty dimer acid or diol of soya oil, D-isosorbide, and/or amino acids such as L-tyrosine and glutamic acid as described in U.S. Pat. Nos. 5,959,066, 6,025,061, 6,063,464, and 6,107,447, and U.S. Patent Application Publication Nos. 2008/0145775 and 2007/0015075, the disclosures of each of which are hereby incorporated by reference in their entirety.

In embodiments, suitable bio-based polymeric resins which may be utilized include polyesters derived from monomers including a fatty dimer acid or diol, D-isosorbide, naphthalene dicarboxylate, a dicarboxylic acid such as, for example, azelaic acid, succinic acid, cyclohexanedioic acid, naphthalene dicarboxylic acid, terephthalic acid, glutamic acid, and combinations thereof, and optionally ethylene glycol, propylene glycol and 1,3-propanediol. Combinations of the foregoing, as well as combinations excluding some of the above monomers, may be utilized, in embodiments.

Polyester polymers may be obtained by polycondensation of a cyclic polyalcohol, which optionally may be functionalized, and a polyacid, optionally in the presence of one or more catalysts. In embodiments, the polyester polymers disclosed herein are made from materials that are readily obtainable from renewable sources, that is, are bio-based, and are biodegradable.

The polyester selected for embodiments herein can be a polyester resin as described in U.S. patent application Ser. No. 13/718,424, filed Dec. 18, 2012, of Valerie Farrugia et al., which is hereby incorporated by reference herein in its entirety. In embodiments, the polyester can be a bio-based, branched polyester resin comprising (i) the condensation product of (a) a hydroxyl donor; (b) a cyclic polyhydroxyl acceptor; and (c) an optional catalyst, and (ii) a polyacid, wherein said bio-based, branched polyester resin is greater than about 90% bio-based.

Polyester polymers may be obtained by polycondensation of a cyclic polyalcohol, which optionally may be functionalized, and a polyacid, optionally in the presence of one or more catalysts. The polyester polymers disclosed herein can be prepared in whole or in part from materials that are readily obtainable from renewable sources, that is, are bio-based, and are biodegradable.

Examples of cyclic hydroxyl acceptors are rosin or resin acids, such as, abietic acid (also known as abietinic acid or sylvic acid), that occur widely in trees. Abietic acid is the primary component of resin acid, is the primary irritant in pine wood and resin, is isolated from rosin and is the most abundant of several closely related carboxylic acids that constitute most of rosin, the solid portion of the oleoresin of coniferous trees. Abietic acid can be produced together with oxalic acid, fumaric acid and malic acid in submerged culture anaerobic fermentation by various types of bacteria and molds. Other rosin acids include, but are not limited to, neoabietic acid, dehydroabietic acid, palustric acid, levopimaric acid, pimaric acid, isopimaric acid and combinations thereof, which are isolated from rosin or are available commercially.

Polyols other than those obtained by reacting a cyclic polyhydroxyl acceptor and a hydroxyl donor can be used in the esterification reaction.

The resulting cyclic polyol is combined with a polyacid in an esterification reaction as known in the art. The ratio of cyclic polyol to polyacid generally is one, however, relative amounts that deviate from that even ratio can be used as a design choice. The reaction conditions and reactants are as known in the art. The reaction can include a catalyst.

Suitable polyester monomers and polyacid monomers for the esterification reaction include those which are bio-based and include known polycarboxylic acids, such as, oxalic acid, malonic acid, succinic acid, glutaric acid, adipic acid, pimelic acid, suberic acid, azelaic acid, sebacic acid, undecanedioic acid, maleic acid, fumaric acid, glutaconic acid, traumatic acid, muconic acid, glutinic acid, diabolic acids, methylene succinic acid and so on, isomers thereof, other dioic acid and so on, citric acid, isocitric acid, aconitic acid, trimesic acid, mellitic acid, tricarballylic acid, trimesic acid, isomers thereof, other trioic acids and so on. Essentially any compound that comprises at least two carboxylic acids and is biodegradable, or not, can be used in the practice of the instant subject matter.

Polycondensation catalysts include tetraalkyl titanates, such as, titanium (iv) butoxide or titanium (iv) iso-propoxide; dialkyltin oxides such as dibutyltin oxide; tetraalkyltins such as dibutyltin dilaurate; dialkyltin oxide hydroxides such as butyltin oxide hydroxide, tetraisopropyl orthotitanate, tetrabutyl orthotitanate monobutyl tin oxide, dibutyl tin oxide; aluminum alkoxides; alkyl zinc; dialkyl zinc; zinc oxide; stannous oxide; butyl(hydroxyl)stannanone; tetraethylammonium iodine; and combinations thereof. The catalysts may be used in amounts of from about 0.001 mol % to about 0.55 mol % based on the starting polyacid/polyester and cyclic polyol used to generate the branched polyester resin. In embodiments, the catalysts may be FASCAT® 4100, FASCAT® 4350, FASCAT® 9100.

Polycondensation temperatures range from about 150° C. to about 250° C., from about 185° C. to about 215° C. Excess polyol may be removed under generated vacuum. Total reaction time may range from about 1 to about 32 hours.

In embodiments, the polyester is a bio-based, branched polyester resin comprising (i) the polycondensation product of (a) glycerine carbonate and/or glycerol; and (b) a rosin acid selected from the group consisting of abietic acid, neoabietic acid, palustric acid, levopimaric acid, dihydroabietic acid, pimaric acid, isopimaric acid and combinations thereof; and (ii) a polyacid selected from the group consisting of succinic acid, fumaric acid, maleic acid, itaconic acid, dodecylsuccinic acid, glutaric acid, adipic acid, pimelic acid, suberic acid and azelaic acid.

In a specific embodiments, the polyester is 1-decyl-12-methyl dodecanedioate of the formula

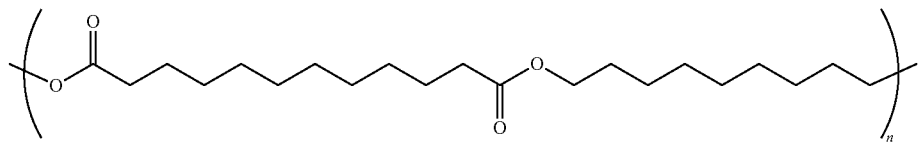

wherein n is an integer from 1 to 1,000 which can be prepared according to the following reaction scheme.

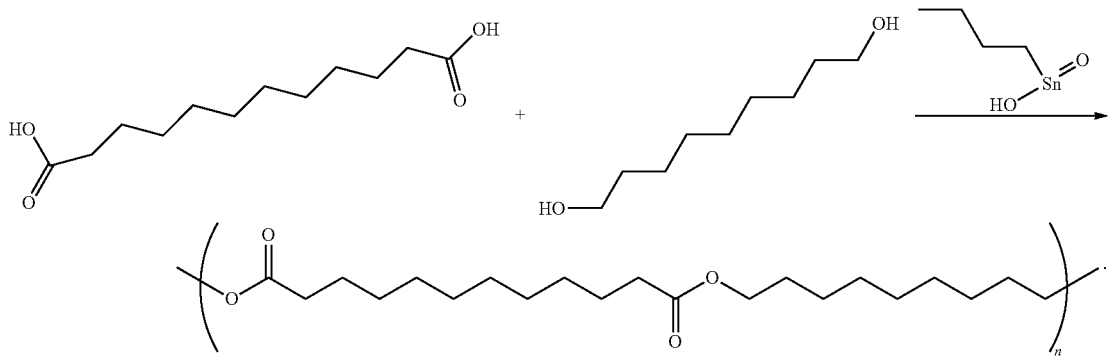

The polyester selected for embodiments herein can further be a polyester resin as described in U.S. patent application Ser. No. 13/423,851, filed Mar. 19, 2012, of Santiago Faucher et al., which is hereby incorporated by reference herein in its entirety. In embodiments, the polyester can be a branched polyester comprising a compound of the formula:

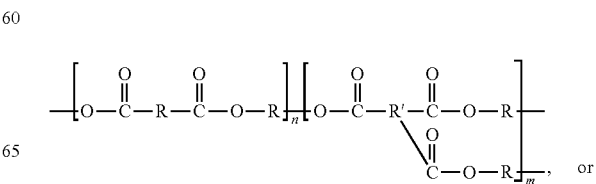

or

-continued

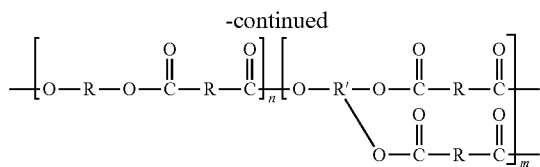

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and
wherein n is an integer from about 1 to about 1,000.

The branched polyester can be prepared by a process for preparing a branched polyester suitable for use in solvent-free emulsification processes, wherein the branched polyester contains at least one of alcohol-derived branching sites or acid-derived branching sites that limit or prevent altogether degradation of the branched polyester during solvent-free emulsification processes such that the branched polyester exhibits less than about 20 percent weight average molecular weight degradation following solvent-free emulsification, comprising contacting at least one branching agent with at least one diacid, at least one diester, or a mixture or combination thereof, and reacting same to produce a branched polyester; wherein the at least one branching agent is sufficient to provide at least one of alcohol-derived branching sites or acid-derived branching sites to the polyester that limit or prevent altogether degradation of the polyester during solvent-free emulsification processes such that the branched polyester exhibits less than about 20 percent molecular weight degradation following solvent-free emulsification.

In embodiments, the phase change ink composition includes a polyester polymer wherein the polyester has a low molecular weight of from about 500 to about 8,000, or from about 600 to about 5,000, or from about 700 to about 3,000.

In further embodiments, the polyester selected has a low polydispersity index. In embodiments, the polyester has a polydispersity index of from about 1.0 to about 8.0, from about 1.2 to about 4.0, or from about 1.5 to about 3.0. Polydispersity index can be measured by any suitable or desired method as is known to those of skill in the art. For example, polydispersity index can be measured by Size Exclusion Chromatography (SEC).

In embodiments, the polyester herein has a molecular weight of from about 500 to about 8,000 and a polydispersity index of from about 1.0 to about 8.0. In a specific embodiment, the polyester selected herein has a molecular weight of from about 3,000 to about 4,000 and a polydispersity index of from about 1.5 to about 3.

Without wishing to be bound by theory, it is believed that the polyester selected herein provides the ink composition herein with a suitable flow which pulls the other components of the ink composition and results in a more robust image, particularly on paper, that is tough and of improved scratch resistance over previous inks.

In embodiments, the polyester selected herein is comprised of macromers or large monomers. As used herein, macromer or large monomer means an assembly of pre-polymerized monomers that has been modified to enable it to act as a monomer since it has a functional group that can take part in further polymerization. The macromer can also be called a low molecular weight polymer or oligomer. It is believed that the large monomers impart to the polyester a variety of physical and chemical properties such as favorable and different rheological properties, improved mechanical properties, added chemical functionality if needed for crosslinking, branching or grafting, improved ink properties such as image robustness and adhesion as well as bio-content depending on the macromere composition.

In certain embodiments, the polyester is comprised of large monomers prepared from monomers selected from the group consisting of 1,2-propylene glycol, naphthalene dicarboxylic acid, 1,3-propanediol, azelaic acid, abietic acid, glycerol, isophthalic acid, hexanediol, DL-mandelic acid, lactic acid, succinic acid, citric acid, (esters or anhydrides thereof—related to diacids only) and mixtures and combinations thereof. In embodiments, large monomers would comprise the product of reactions combining above monomers, for example, diol with diacid or anhydride, that is, reactions between diol and diacid monomers to make macromers.

In specific embodiments, the polyester is a bio-based polyester selected from the group consisting of poly(dimerized rosin-co-1,2-propylene glycol-co-naphthalene dicarboxylic acid-co-1,3-propanediol-co-azelaic acid-co-rosin fumarate) copolymer, poly(2-(2-hydroxy-2-((1R,4aR,4bR)-7-isopropyl-1,4a-dimethyl-1,2,3,4,4a,4b,5,6,10,10a-decahydro-phenanthrene-1-carbonyl)oxy)ethyl) 6-(2-hydroxy-3-(((1R, 4aR,4bR)-7-isopropyl-1,4a-dimethyl-1,2,3,4,4a,4b,5,6,10, 10a-decahydrophenanthrene-1-carbonyl)oxy)propyl) naphthalene-2,6-dicarboxylate-co-isophthalic acid-co-1,6-hexanediol) co polymer, poly(mandelic acid-co-lactic acid) copolymer, and mixtures and combinations thereof.

The polyester can be included in the phase change ink composition in any suitable or desired amount. In embodiments, the polyester is present in the phase change ink composition in an amount of from about 1 to about 25, or from about 4 to about 15, or from about 8 to about 12 percent by weight, based on the total weight of the phase change ink composition.

Amorphous and Crystalline Compounds.

In embodiments, the phase change ink composition herein comprises an amorphous compound and a crystalline compound. A mixture of crystalline and amorphous small molecule compounds in solid ink formulations provides robust inks, and in particular, solid inks which demonstrate robust images on coated paper. See U.S. patent application Ser. No. 13/095,636 entitled "Solid Ink Compositions Comprising Crystalline-Amorphous Mixtures" of Jennifer L. Belelie et al., filed Apr. 27, 2011, which is hereby incorporated by reference herein in its entirety. Print samples made with such phase change inks demonstrate better robustness with respect to scratch, fold, and fold offset as compared to currently available phase change inks.

Using this approach is surprising, however, due to the known properties of crystalline or amorphous materials. For crystalline materials, small molecules generally tend to crystallize when solidifying and low molecular weight organic solids are generally crystals. While crystalline materials are generally harder and more resistant, such materials are also much more brittle, so that printed matter made using a mainly crystalline ink composition is fairly sensitive to damage. For amorphous materials, high molecular weight amorphous materials, such as polymers, become viscous and sticky liquids at high temperature, but do not show sufficiently low viscosity at high temperatures. As a result, the polymers cannot be jetted from print head nozzles at desirable jetting temperature (about 140° C.).

It was further previously discovered that a robust solid ink can be obtained through a blend of crystalline and amorphous compounds. See U.S. patent application Ser. No. 13/456,805 entitled "Phase Change Inks Comprising Organic Pigments" of Jennifer L. Belelie et al., filed Apr. 26, 2012, which is hereby incorporated by reference herein in its entirety.

In embodiments, the present phase change ink compositions include a blend of (1) crystalline compounds and (2) amorphous compounds, in any suitable or desired amount, in embodiments, generally in a weight ratio of from about 60:40 to about 95:5, respectively. In more specific embodiments, the weight ratio of the crystalline to amorphous compound is from about 65:35 to about 95:5, or from about 70:30 to about 90:10, or from about 70:30 to about 80:20. In other embodiments, the crystalline and amorphous compounds are blended in a weight ratio of from about 1.5 to about 20, or from about 2.0 to about 10, respectively.

Each compound or component imparts specific properties to the solid inks, and the resulting inks incorporating a blend of these amorphous and crystalline compounds demonstrate excellent robustness on uncoated and coated substrates. The crystalline compound in the ink formulation drives the phase change through rapid crystallization on cooling. The crystalline compound also sets up the structure of the final ink film and creates a hard ink by reducing the tackiness of the amorphous compound. The amorphous compounds provide tackiness and impart robustness to the printed ink.

The Amorphous Compound.

As used herein, the term "alkyl" refers to an aliphatic hydrocarbon group. The alkyl moiety may be a "saturated alkyl" group, which means that it does not contain any alkene or alkyne moieties. The alkyl moiety may also be an "unsaturated alkyl" moiety, which means that it contains at least one alkene or alkyne moiety. An "alkene" moiety refers to a group consisting of at least two carbon atoms and at least one carbon-carbon double bond, and an "alkyne" moiety refers to a group consisting of at least two carbon atoms and at least one carbon-carbon triple bond. The alkyl moiety, whether saturated or unsaturated, may be branched, straight chain, or cyclic.

The alkyl group of the amorphous compound may have 1 to 40 carbon atoms (whenever it appears herein, a numerical range such as "1 to 40" refers to each integer in the given range; e.g., "1 to 40 carbon atoms" means that the alkyl group may consist of 1 carbon atom, 2 carbon atoms, 3 carbon atoms, etc., up to and including 40 carbon atoms, although the present definition also covers the occurrence of the term "alkyl" where no numerical range is designated). The alkyl group may also be a medium size alkyl having 1 to 10 carbon atoms. The alkyl group could also be a lower alkyl having 1 to 4 carbon atoms. The alkyl group of the compounds herein may be designated as "C1-C5 alkyl" or similar designations. By way of example only, "C1-C4 alkyl" indicates that there are one to four carbon atoms in the alkyl chain, i.e., the alkyl chain is selected from the group consisting of methyl, ethyl, propyl, iso-propyl, n-butyl, iso-butyl, sec-butyl, and t-butyl. The alkyl group may be substituted or unsubstituted. When substituted, any group(s) besides hydrogen can be the substituent group(s). When substituted, the substituent group(s) is(are) one or more group(s) individually and independently selected from the following non-limiting illustrative list: alkyl, cycloalkyl, hydroxy, alkoxy, cyano, halo, and amino, including mono- and di-substituted amino groups. Typical alkyl groups include, but are not limited to, methyl, ethyl, propyl, isopropyl, butyl, isobutyl, tertiary butyl, pentyl, hexyl, ethenyl, propenyl, butenyl, cyclopropyl, cyclobutyl, cyclopentyl, cyclohexyl, and the like. Each substituent group may be further substituted.

The term "aryl," as used herein, alone or in combination, means a carbocyclic aromatic system containing one, two or three rings wherein such rings may be attached together in a pendent manner or may be fused. The term "aryl," embraces aromatic radicals such as benzyl, phenyl, naphthyl, anthracenyl, and biphenyl.

The term "arylalkyl" as used herein, alone or in combination, refers to an aryl group attached to the parent molecular moiety through an alkyl group.

In embodiments, the amorphous compound of the phase change inks herein comprises a first ester of tartaric acid of the formula

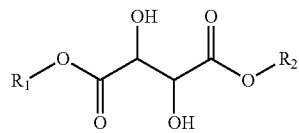

or a first ester of citric acid of the formula

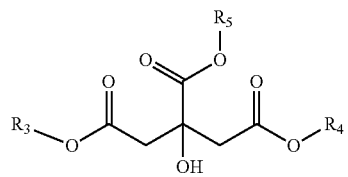

wherein each $R_1$, $R_2$, $R_3$, $R_4$, and $R_5$ is independently an alkyl group, wherein the alkyl can be straight, branched or cyclic, saturated or unsaturated, substituted or unsubstituted, having from about 1 to about 40 carbon atoms or a substituted or unsubstituted aromatic or heteroaromatic group. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl. In certain embodiments, each $R_1$, $R_2$, $R_3$, $R_4$, and $R_5$ is independently a cyclohexyl group optionally substituted with one or more alkyl groups selected from methyl, ethyl, n-propyl, isopropyl, n-butyl and t-butyl.

In certain embodiments of the formula

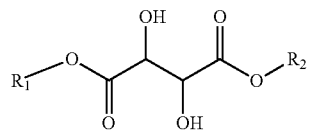

one of $R_1$ and $R_2$ is 2-isopropyl-5-methylcyclohexyl, and the other one of $R_1$ and $R_2$ is 2-isopropyl-5-methylcyclohexyl, 4-t-butylcyclohexyl, or cyclohexyl, or one of $R_1$ and $R_2$ is 4-t-butylcyclohexyl, and the other one of $R_1$ and $R_2$ is cyclohexyl. In certain embodiments, $R_1$ and $R_2$ are each 2-isopropyl-5-methylcyclohexyl. In certain embodiments, $R_1$ is 2-isopropyl-5-methylcyclohexyl and $R_2$ is 4-t-butylcyclohexyl. In certain other embodiments, $R_1$ is 2-isopropyl-5-methylcyclohexyl and $R_2$ is cyclohexyl. In still other embodiments, $R_1$ is 4-t-butylcyclohexyl and $R_2$ is cyclohexyl.

In certain embodiments of the formula

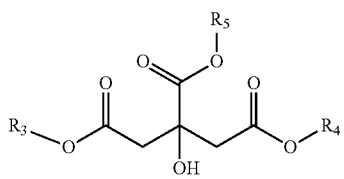

one of $R_3$, $R_4$ and $R_5$ is 2-isopropyl-5-methylcyclohexyl, and the other one of $R_3$, $R_4$ and $R_5$ is 2-isopropyl-5-methylcyclohexyl, 4-t-butylcyclohexyl, or cyclohexyl, or one of $R_3$, $R_4$ and $R_5$ is 4-t-butylcyclohexyl, and the other one of $R_3$, $R_4$ and $R_5$ is cyclohexyl. In certain embodiment, $R_3$, $R_4$ and $R_5$ are each 2-isopropyl-5-methylcyclohexyl. In certain embodiment, $R_3$ is 2-isopropyl-5-methylcyclohexyl and $R_4$ and $R_5$ are each 4-t-butylcyclohexyl. In certain embodiment, $R_3$ is 2-isopropyl-5-methylcyclohexyl and $R_4$ and $R_5$ are each cyclohexyl. In certain embodiment, $R_1$ is 4-t-butylcyclohexyl and $R_4$ and $R_5$ are each cyclohexyl.

In certain embodiment, the amorphous compound is selected from the group consisting of bis(2-isopropyl-5-methylcyclohexyl) L-tartrate or (4-t-butylcyclohexyl)(cyclohexyl)-L-tartrate, and stereoisomers and mixtures thereof.

Some suitable amorphous materials are disclosed in U.S. patent application Ser. No. 13/095,784 to Morimitsu et al., which is hereby incorporated by reference in its entirety. The amorphous materials may comprise an ester of tartaric acid of the formula

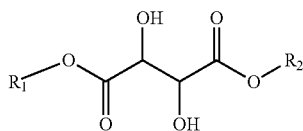

wherein $R_1$ and $R_2$ each, independently of the other, meaning that they can be the same or different, is selected from the group consisting of alkyl group, wherein the alkyl portion can be straight, branched or cyclic, saturated or unsaturated, substituted or unsubstituted, having from about 1 to about 40 carbon atoms or an substituted or unsubstituted aromatic or heteroaromatic group. In certain embodiments, each $R_1$ and $R_2$ is independently a cyclohexyl group optionally substituted with one or more alkyl group(s) selected from methyl, ethyl, n-propyl, isopropyl, n-butyl and t-butyl. In certain embodiments, R1 and R2 are each 2-isopropyl-5-methylcyclohexyl.

The tartaric acid backbone can be selected from L-(+)-tartaric acid, 0-(−)-tartaric acid, DL-tartaric acid, or mesotartaric acid, and mixtures thereof. Depending on the R groups and the stereochemistries of tartaric acid, the esters could form crystals or stable amorphous compounds. In specific embodiments, the amorphous compound is selected from the group consisting of di-L-menthyl L-tartrate, di-DL-menthyl L-tartrate (DMT), di-L-menthyl DL-tartrate, di-DL-menthyl DL-tartrate, and any stereoisomers and mixtures thereof.

These materials show, relatively low viscosity (<102 centipoise (cps), or from about 1 to about 100 cps, or from about 5 to about 95 cps) near the jetting temperature (about 140° C., or from about 100 to about 140° C., or from about 105 to about 140° C.) but very high viscosity (>105 cps) at room temperature.

To synthesize the amorphous component, tartaric acid can be reacted with a variety of alcohols to make di-esters as shown in the synthesis scheme shown in U.S. patent application Ser. No. 13/095,784. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 40 carbon atoms, or a substituted or unsubstituted aromatic or heteroaromatic group, and mixtures thereof. A variety of alcohols may be used in the esterification such as, for example, menthol, isomenthol, neomenthol, isoneomenthol, and any stereoisomers and mixtures thereof. Mixtures of aliphatic alcohols may be used in the esterification. For example, a mixture of two aliphatic alcohols may be used in the esterification. The molar ratios of the aliphatic alcohols may be from 25:75 to 75:25, from 40:60 to 60:40, or about 50:50. Examples of suitable aliphatic alcohol whose mixtures form amorphous compounds when reacted with tartaric acid include cyclohexanol and substituted cyclohexanol (e.g., 2, 3 or 4-tert-butyl-cyclohexanol).

In embodiments, two or more molar equivalents of alcohol may be used in the reaction to produce the di-esters of tartaric acid. If one molar equivalent of alcohol is used, the result is mostly mono-esters.

Other suitable amorphous components for the phase change inks herein include those disclosed in U.S. patent application Ser. No. 13/095,795 to Morimitsu et al., which is hereby incorporated by reference in its entirety. The amorphous materials may comprise a compound of the formula

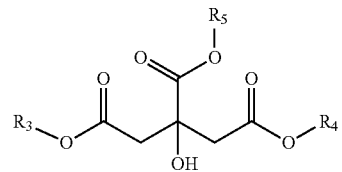

wherein $R_3$, $R_4$ and $R_5$ are independently an alkyl group, wherein the alkyl can be straight, branched or cyclic, saturated or unsaturated, substituted or unsubstituted, having from about 1 to about 40 carbon atoms, or an substituted or unsubstituted aromatic or heteroaromatic group, and mixtures thereof.

In embodiments, the amorphous compound is a compound of the formula

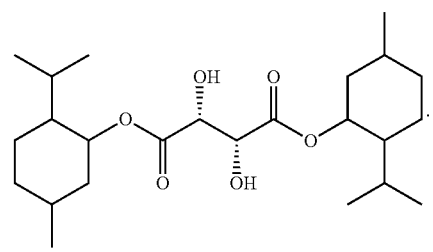 [SMILES: CC1CCC(C(C)C)C(OC(=O)[C@H](O)[C@@H](O)C(=O)OC2CC(C)CCC2C(C)C)C1]

These amorphous materials can be synthesized by an esterification reaction of citric acid. In particular, citric acid can be reacted with a variety of alcohols to make tri-esters according to the synthesis scheme disclosed therein. In embodiments, the phase change ink composition is obtained by using amorphous compounds synthesized from citric acid and at least one alcohol in an esterification reaction.

The amorphous compound can be present in any suitable or desired amount. In embodiments, the amorphous material is present an amount of from about 5 percent to about 40 percent by weight, or from about 5 percent to about 35 percent by weight, or from about 10 percent to about 30 percent by weight of the total weight of the ink composition.

The Crystalline Compound.

In embodiments, the phase change ink compositions herein include a crystalline compound comprising a second ester of tartaric acid of the formula

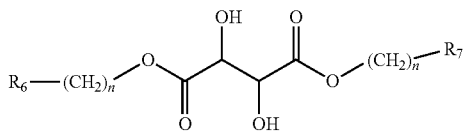

wherein each $R_6$ and $R_7$ is independently an aryl or a heteroaryl optionally substituted with a lower alkyl and alkoxy, each n is independently 0 to 3. In certain embodiments, each $R_6$ and $R_7$ is independently an optionally substituted aryl, such as a phenyl. In certain embodiments, each $R_6$ and $R_7$ is independently not substituted, or substituted with methyl, ethyl, isopropyl, methoxy or ethoxy. In certain embodiments, each $R_6$ and $R_7$ is independently a phenyl optionally substituted with methyl or methoxy.

In certain embodiments, each $R_6$ and $R_7$, independently is selected from the group consisting of

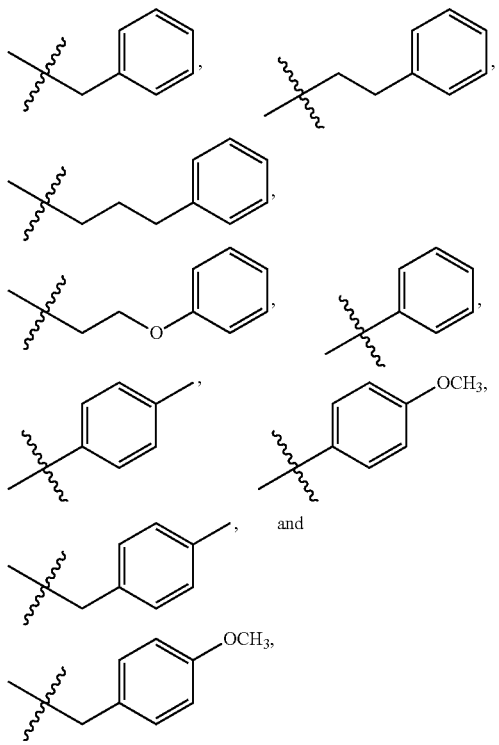

and mixtures thereof, wherein ~~~ represents the point of attachment of the $R_6$ and $R_7$ group to the compound.

In certain embodiments, the tartaric acid backbone is selected from L-(+)-tartaric acid, D-(−)-tartaric acid, DL-tartaric acid, or mesotartaric acid, and mixtures thereof.

In embodiments, the crystalline component may comprise amide, aromatic ester, linear diester, urethanes, sulfones, tartaric acid ester derivatives with aromatic groups, or mixtures thereof.

Suitable crystalline components include those disclosed in U.S. patent application Ser. No. 13/457,221 to Morimitsu et al., which is hereby incorporated by reference herein in its entirety. These crystalline materials comprise the following structure:

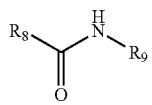

wherein $R_8$ and $R_9$ can be the same or different, each $R_8$ and $R_9$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, from about 6 to about 20 carbon atoms, or from about 6 to about 10 carbon atoms.

Suitable crystalline components also include those disclosed in U.S. patent application Ser. No. 13/456,916 to Morimitsu et al., which is hereby incorporated by reference herein in its entirety. These crystalline materials comprise the following structure:

$R_{10}$—O—[(CH$_2$)$_2$O]$_p$—$R_{11}$ wherein $R_{10}$ and $R_{11}$ can be the same or different, and wherein each $R_{10}$ and $R_{11}$ is independently selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms; (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to about 40 carbon atoms, or about 6 to about 20 carbon atoms, or from about 6 to about 10 carbon atoms, although the numbers can be outside of these ranges, and mixtures thereof, provided that at least one of $R_{10}$ and $R_{11}$ is an aromatic group; and p is 0 or 1.

Examples of crystalline aromatic ether include, but are not limited to,

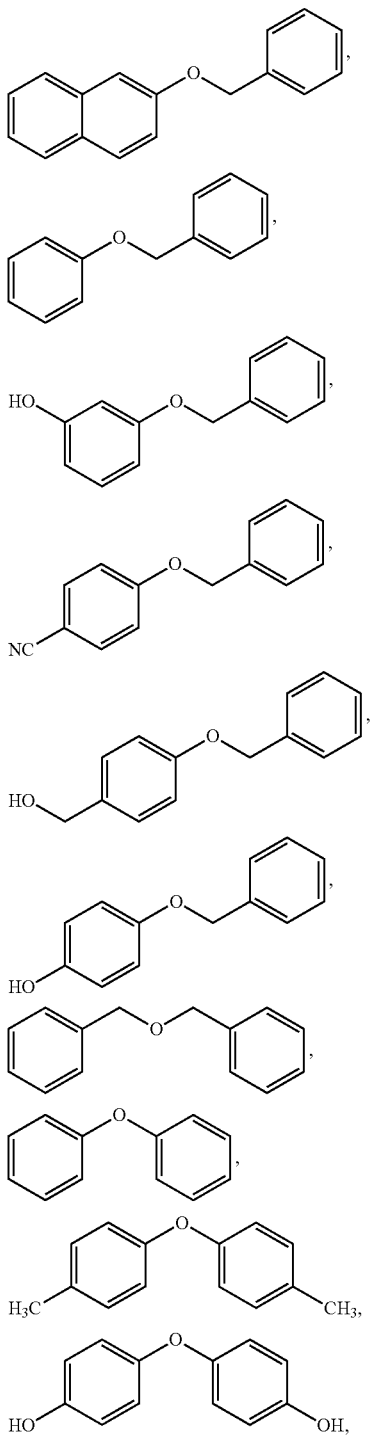

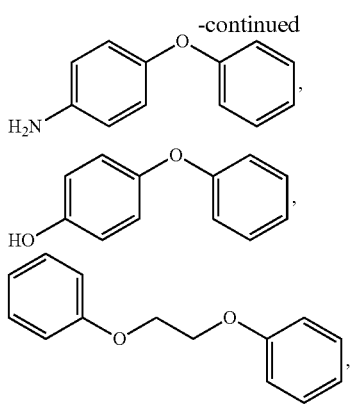

and mixtures thereof.

Suitable crystalline components also include those disclosed in U.S. patent application Ser. No. 13/095,555 to Chopra et al., which is hereby incorporated by reference herein in its entirety. These crystalline materials comprise an ester of an aliphatic linear diacid having the following structure:

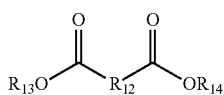

wherein $R_{12}$ may be substituted or unsubstituted alkyl chain and is selected from the group consisting of —$(CH_2)_1$— to —$(CH_2)_{12}$—, and wherein $R_{13}$ and $R_{14}$, each independently of the other, is selected from the group consisting of a substituted or unsubstituted aromatic or heteroaromatic group, substituents including alkyl groups, wherein the alkyl portion can be straight, branched or cyclic.

Suitable crystalline components also include those disclosed in U.S. patent application Ser. No. 13/456,619 to Chopra et al., which is hereby incorporated by reference herein in its entirety. These crystalline materials comprise diurethanes having the following structure:

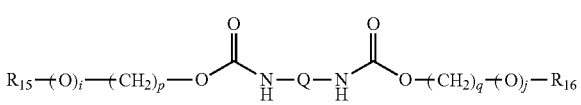

wherein Q is alkanediyl; each $R_{15}$ and $R_{16}$ is independently phenyl or cyclohexyl optionally substituted with one or more alkyl; i is 0 or 1; j is 0 or 1; p is 1 to 4; q is 1 to 4. In certain of such embodiments, each $R_{15}$ and $R_{16}$ is independently phenyl or cyclohexyl optionally substituted with one or more methyl or ethyl. In certain of such embodiments, $R_{15}$ and $R_{16}$ is phenyl. In certain embodiments, Q is —$(CH_2)_n$— and n is 4 to 8. In certain of such embodiments, n is 6. In certain embodiments, each $R_{15}$ and $R_{16}$, is independently selected from benzyl, 2-phenylethyl, 2-phenoxyethyl, $C_6H_5(CH_2)_4$—, cyclohexyl, 2-methylcyclohexyl, 3-phenylpropanyl, 3-methylcyclohexyl, 4-methylcyclohexyl, cyclohexylmethyl, 2-methylcyclohexylmethyl, 3-methylcyclohexylmethyl, 4-methylcyclohexylmethyl, and 4-ethylcyclohexanyl.

Suitable crystalline components also include those disclosed in U.S. patent application Ser. No. 13/457,323 to Morimitsu et al., which is hereby incorporated by reference herein in its entirety. These crystalline component being a sulfone compound having the following structure:

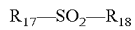

wherein $R_{17}$ and $R_{18}$ can be the same or different, and wherein $R_{17}$ and $R_{18}$ each, independently of the other is selected from the group consisting of (i) an alkyl group, which can be a linear or branched, cyclic or acyclic, substituted or unsubstituted, saturated or unsaturated, alkyl group, and wherein heteroatoms may optionally be present in the alkyl group, in embodiments, having from about 1 to about 40 carbon atoms, from about 1 to about 20 carbon atoms, or from about 1 to about 10 carbon atoms, although the numbers can be outside of these ranges, (ii) an arylalkyl group, which can be a substituted or unsubstituted arylalkyl group, wherein the alkyl portion of arylalkyl group can be linear or branched, cyclic or acyclic, substituted or unsubstituted, saturated or unsaturated, and wherein heteroatoms may optionally be present in either the aryl portion or the alkyl portion of the arylalkyl group, in embodiments, having from about 4 to about 40 carbon atoms, from about 7 to about 20 carbon atoms, or from about 7 to about 12 carbon atoms, although the numbers can be outside of these ranges; and (iii) an aromatic group, which can be a substituted or unsubstituted aromatic group, wherein the substituent can be a linear, branched, cyclic or acyclic alkyl group and wherein heteroatoms may optionally be present in the aromatic group, having from about 3 to from about 40 carbon atoms, from about 6 to about 20 carbon atoms, or about 6 to about 10 carbon atoms, although the numbers can be outside of these ranges, and mixtures thereof.

In certain embodiments, each $R_{17}$ and $R_{18}$ is independently alkyl, or aryl, optionally substituted with one or more halo, amino, hydroxy, or cyano groups and combinations thereof, or $R_{17}$ and $R_{18}$ taken together with the S atom to which they are attached form a heterocyclic ring. In certain of such embodiments, each $R_{17}$ and $R_{18}$ is independently an optionally substituted alkyl, such as, methyl, ethyl, isopropyl, n-butyl, or t-butyl. In certain of such embodiments, each $R_6$ and $R_7$ is independently an optionally substituted aryl, such as, phenyl, or benzyl. In certain embodiments, each $R_{17}$ and $R_{18}$ is independently substituted with one or more amino, chloro, fluoro, hydroxy, cyano or combinations thereof. Substitution on the aryl groups may be made in the ortho, meta or para position of the phenyl groups and combinations thereof. In certain embodiments, each $R_{17}$ and $R_{18}$ is independently 2-hydroxyethyl, or cyanomethyl.

In certain embodiments, the crystalline component may include diphenyl sulfone, dimethyl sulfone, bis(4-hydroxyphenyl) sulfone, bis(4-aminophenyl) sulfone, bis(3-aminophenyl) sulfone, bis(4-chlorophenyl) sulfone, bis(4-fluorophenyl) sulfone, 2-hycroxyphenyl-4-hydroxyphenyl sulfone, phenyl-4-chlorophenyl sulfone, phenyl-2-aminophenyl sulfone, bis(3-amino-4-hydroxyphenyl) sulfone, dibenzyl sulfone, methylethyl sulfone, diethyl sulfone, methylisopropyl sulfone, ethylisopropyl sulfone, di-n-butyl sulfone, divinyl sulfone, methyl-2-hydroxymethyl sulfone, methylchloromethyl sulfone, sulfolane, 3-sulfolene, and mixtures thereof.

In embodiments, the crystalline compound may comprise an ester of tartaric acid of the following formula:

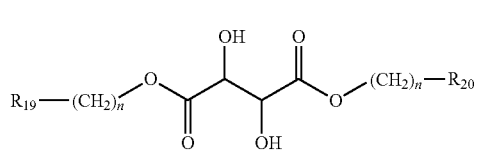

wherein each $R_{19}$ and $R_{20}$ is independently an aryl or a heteroaryl optionally substituted with a lower alkyl and alkoxy, each n is independently 0 to 3. In certain embodiments, each $R_{19}$ and $R_{20}$ is independently an optionally substituted aryl, such as a phenyl. In certain embodiments, each $R_{19}$ and $R_{20}$ is independently not substituted, or substituted with methyl, ethyl, isopropyl, methoxy or ethoxy. In certain embodiments, each $R_{19}$ and $R_{20}$ is independently a phenyl optionally substituted with methyl or methoxy.

In certain embodiments, each $R_{19}$ and $R_{20}$, independently is selected from the group consisting of

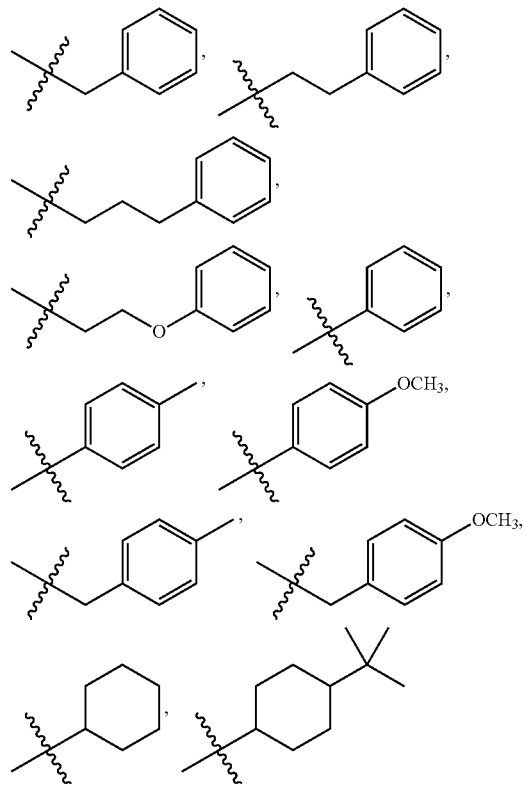

and mixtures thereof.

In certain embodiments, the tartaric acid backbone is selected from L-(+)-tartaric acid, D-(−)-tartaric acid, DL-tartaric acid, or mesotartaric acid, and mixtures thereof.

In certain embodiments, the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis(4-methylphenyl) L-tartrate, bis(4-methoxylphenyl) L-tartrate, bis(4-methylbenzyl) L-tartrate, bis(4-methoxylbenzyl) L-tartrate, and stereoisomers and mixtures thereof.

In embodiments, the crystalline compound is a compound of the formula

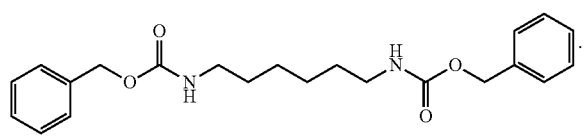 [SMILES: O=C(NCCCCCCNC(=O)OCc1ccccc1)OCc1ccccc1]

The crystalline materials show sharp crystallization, relatively low viscosity ($\leq 10^1$ centipoise (cps), or from about 0.5 to about 20 cps, or from about 1 to about 15 cps) at a temperature of about 140° C., but very high viscosity (>10⁶ cps) at room temperature. These materials have a melting temperature ($T_{melt}$) of less than 150° C., or from about 65 to about 150° C., or from about 66 to about 145° C., and a crystallization temperature ($T_{crys}$) of greater than 60° C., or from about 60 to about 140° C., or from about 65 to about 120° C. The ΔT between $T_{melt}$ and $T_{crys}$ is less than about 55° C.

The crystalline compound can be present in any suitable or desired amount. In embodiments, the crystalline material is present an amount of from about 60 percent to about 95 percent by weight, or from about 65 percent to about 95 percent by weight, or from about 70 percent to about 90 percent by weight of the total weight of the ink composition.

Synthesis of Tartaric Acid Esters.

Tartaric acid can be reacted with a variety of alcohols to make di-esters as shown in the synthesis scheme below, which illustrates the preparation of a tartaric acid di-ester compound of the present embodiments. The esterification can be conducted by a one-step reaction:

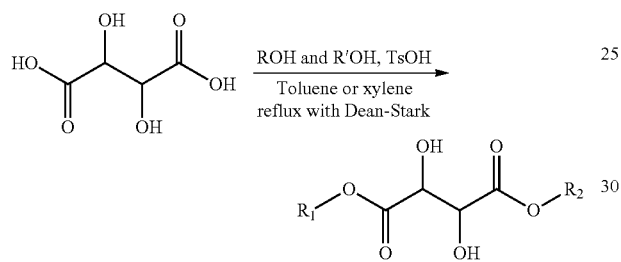

wherein ROH and R'OH may be the same or different.

To synthesize the amorphous materials, a variety of aliphatic alcohols may be used in the esterification such as, for example, menthol, isomenthol, neomenthol, isoneomenthol, and any stereoisomers and mixtures thereof.

In embodiments, menthol is selected as the alcohol. Both tartaric acid and menthol have stereoisomers, therefore there are many possible combinations in terms of chirality. In embodiments, three combinations of tartaric acid and menthol (di-L-menthyl L-tartrate, di-DL-menthyl L-tartrate, di-L-menthyl DL-tartrate) can be synthesized. Surprisingly, all combinations, even in the combination of optically pure L-menthol and L-tartaric acid, made amorphously setting materials. Suitable alcohols to be used with the present embodiments may be selected from the group consisting of alkyl alcohol, wherein the alkyl portion of the alcohol can be straight, branched or cyclic, saturated or unsaturated, substituted or unsubstituted, having from about 1 to about 16 carbon atoms.

To synthesize the crystalline materials, a variety of aromatic alcohols may be used in the esterification. Non-limiting exemplary aromatic alcohols include the following

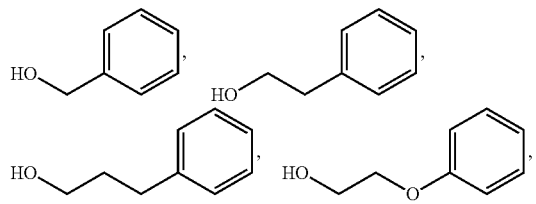

-continued

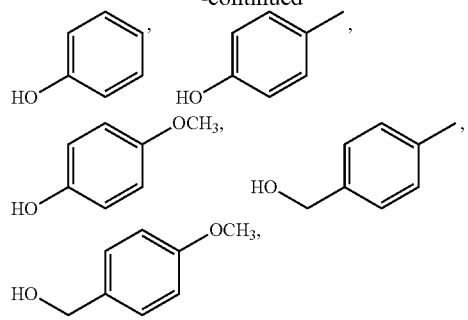

and any stereoisomers and mixtures thereof.

In embodiments, two or more molar equivalents of alcohol may be used in the reaction to produce the di-esters of tartaric acid. If one molar equivalent of alcohol is used, the result is mostly mono-esters.

In a specific embodiment, the phase change ink compositions herein include an amorphous compound which comprises a first ester of tartaric acid of the formula

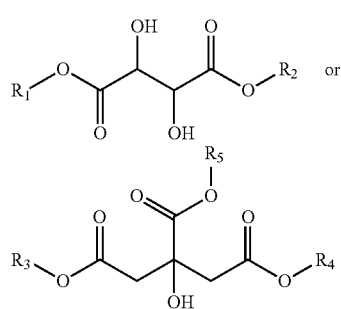

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and a crystalline compound which comprises a second ester of tartaric acid of the formula

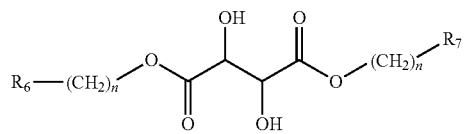

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3.

In another embodiment, the phase change ink composition herein includes a crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis-4-methylphenyl) L-tartrate, bis(4-methoxyphenyl) L-tartrate, bis(4-methylbenzyl) L-tartrate, bis(4-methoxybenzyl) L-tartrate, and stereoisomers and mixtures thereof; and an amorphous compound selected from the group consisting of bis(2-isopropyl-5-methylcyclohexyl) L-tartrate, (4-t-butylcyclohexyl)(cyclohexyl)-L-tartrate, stereoisomers and mixtures thereof.

The crystalline and amorphous materials of the present embodiments were found to be miscible with one another and the resulting ink compositions formulated with the crystalline and amorphous materials show good rheological profiles. Image samples created by the phase change ink composition on coated paper by K-proof exhibit excellent robustness. A K-proofer is a common test fixture in a print shop. In this case the proofer has been modified to heat the printing plate to melt the phase change ink. The K-Proofer used has three rectangular gravure patterns each approximately 9.4×4.7 centimeters. The cell density of the first rectangle is nominally 100%, the second 80%, and the third 60%. In practice this K-proof plate results in films (or pixels) of about 5 microns in thickness (or height). Test ink is spread over the heated gravure plate and a test print is made by passing a wiping blade across the plate surface immediately follow by a rubber roll upon which a test paper has been secured. As the paper roll passes ink is transferred from the gravure cells to the paper. Furthermore, using the present crystalline and amorphous materials has additional advantages of being low cost, and from a potentially bio-derived source.

The phase change ink compositions herein comprise a balance of amorphous and crystalline materials to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the present tartrate compounds and derivatives thereof, which provide crystalline components for the phase change inks, have been discovered to produce robust inks having desirable rheological profiles and that meet the many requirements for inkjet printing.

The present phase change ink compositions comprise the crystalline and amorphous material in combination with a polyester as described herein and colorant. The present embodiments comprise a balance of amorphous and crystalline materials in combination with a polyester to realize a sharp phase transition from liquid to solid and facilitate hard and robust printed images, while maintaining a desired level of viscosity. Prints made with this ink demonstrated advantages over commercially available inks, such as for example, better robustness against scratch. Thus, the resulting ink compositions comprising a blend of the crystalline and amorphous compounds and polyester show good rheological profiles and that meet the many requirements for ink jet printing.

The phase change ink compositions can include any suitable or desired colorant such as colorants selected from the group consisting of traditional dyes, pigments, and mixtures and combinations thereof present in any suitable or desired amount. If more than one colorant is included, the total amount of colorant present in the phase change ink composition can be any desired or effective amount to obtain the desired color or hue, in embodiments from about 0.1 to about 50 percent, or from about 0.1 percent to about 20 percent total colorant by weight based on the total weight of the phase change ink composition.

Any desired or effective colorant can be employed in the inks, including dyes, pigments, mixtures thereof, and the like, provided that the colorant can be dissolved or dispersed in the ink vehicle. The compositions can be used in combination with conventional ink colorant materials, such as Color Index (C.I.) Solvent Dyes, Disperse Dyes, modified Acid and Direct Dyes, Basic Dyes, Sulphur Dyes, Vat Dyes, and the like.

Examples of suitable dyes include Neozapon® Red 492 (BASF); Orasol® Red G (Pylam Products); Direct Brilliant Pink B (Oriental Giant Dyes); Direct Red 3BL (Classic Dyestuffs); Supranol® Brilliant Red 3BW (Bayer AG); Lemon Yellow 6G (United Chemie); Light Fast Yellow 3G (Shaanxi); Aizen Spilon Yellow C-GNH (Hodogaya Chemical); Bemachrome Yellow GD Sub (Classic Dyestuffs); Cartasol® Brilliant Yellow 4GF (Clariant); Cibanone Yellow 2G (Classic Dyestuffs); Orasol® Black RLI (BASF); Orasol® Black CN (Pylam Products); Savinyl Black RLSN (Clariant); Pyrazol Black BG (Clariant); Morfast® Black 101 (Rohm & Haas); Diaazol Black RN (ICI); Thermoplast® Blue 670 (BASF); Orasol® Blue GN (Pylam Products); Savinyl Blue GLS (Clariant); Luxol Fast Blue MBSN (Pylam Products); Sevron Blue 5GMF (Classic Dyestuffs); Basacid® Blue 750 (BASF); Keyplast Blue (Keystone Aniline Corporation); Neozapon® Black X51 (BASF); Classic Solvent Black 7 (Classic Dyestuffs); Sudan Blue 670 (C.I. 61554) (BASF); Sudan Yellow 146 (C.I. 12700) (BASF); Sudan Red 462 (C.I. 26050) (BASF); C.I. Disperse Yellow 238; Neptune Red Base NB543 (BASF, C.I. Solvent Red 49); Neopen® Blue FF-4012 (BASF); Fastol® Black BR (C.I. Solvent Black 35) (Chemische Fabriek Triade BV); Morton Morplas Magenta 36 (C.I. Solvent Red 172); metal phthalocyanine colorants, such as those disclosed in U.S. Pat. No. 6,221,137, the disclosure of which is totally incorporated herein by reference, and the like. Polymeric dyes can also be used, such as those disclosed in, for example, U.S. Pat. No. 5,621,022 and U.S. Pat. No. 5,231,135, the disclosures of each of which are hereby incorporated by reference herein in their entireties, and commercially available from, for example, Milliken & Company as Milliken Ink Yellow 869, Milliken Ink Blue 92, Milliken Ink Red 357, Milliken Ink Yellow 1800, Milliken Ink Black 8915-67, uncut Reactint® Orange X-38, uncut Reactint® Blue X-17, Solvent Yellow 162, Acid Red 52, Solvent Blue 44, and uncut Reactint® Violet X-80.

In specific embodiments, the phase change ink compositions herein are pigmented phase change ink compositions. In embodiments, the pigment is selected from the group consisting of metal phthalocyanine, metal-free phthalocyanine, and mixtures and combinations thereof. In certain embodiments, the phase change ink composition includes a pigment selected from the group consisting of cyan, green, blue, black, carbon black, Pigment Blue, copper phthalocyanine, and mixtures and combinations thereof. In a specific embodiment, the pigment is a cyan pigment.

Suitable pigments that can be used in embodiments herein include, for example, PALIOGEN® Violet 5100 (commercially available from BASF); PALIOGEN® Violet 5890 (commercially available from BASF); HELIOGEN® Green L8730 (commercially available from BASF); LITHOL® Scarlet D3700 (commercially available from BASF); SUNFAST® Blue 15:4 (commercially available from Sun Chemical); HOSTAPERM® Blue B2G-D (commercially available from Clariant); HOSTAPERM® Blue B4G (commercially available from Clariant); Permanent Red P-F7RK; HOSTAPERM® Violet BL (commercially available from Clariant); LITHOL® Scarlet 4440 (commercially available from BASF); Bon Red® C (commercially available from Dominion Color Company); ORACET® Pink RF (commercially available from Ciba); PALIOGEN® Red 3871 K (commercially available from BASF); SUNFAST® Blue 15:3 (commercially available from Sun Chemical); PALIOGEN® Red 3340 (commercially available from BASF); SUNFAST® Carbazole Violet 23 (commercially available from Sun Chemical); LITHOL® Fast Scarlet L4300 (commercially available from BASF); SUNBRITE® Yellow 17 (commercially available from Sun Chemical); HELIOGEN® Blue L6900, L7020 (commercially available from BASF); SUN-BRITE® Yellow 74 (commercially available from Sun Chemical); SPECTRA® PAC C Orange 16 (commercially available from Sun Chemical); HELIOGEN® Blue K6902, K6910 (commercially available from BASF); SUNFAST® Magenta 122 (commercially available from Sun Chemical); HELIOGEN® Blue D6840, D7080 (commercially available from BASF); Sudan Blue OS (commercially available from BASF); NEOPEN® Blue FF4012 (commercially available from BASF); PV Fast Blue B2GO1 (commercially available from Clariant); IRGALITE® Blue BCA (commercially available from Ciba); PALIOGEN® Blue 6470 (commercially available from BASF); Sudan Orange G (commercially available from Aldrich), Sudan Orange 220 (commercially available from BASF); PALIOGEN® Orange 3040 (BASF); PALIOGEN® Yellow 152, 1560 (commercially available from BASF); LITHOL® Fast Yellow 0991 K (commercially available from BASF); PALIOTOL® Yellow 1840 (commercially available from BASF); NOVOPERM® Yellow FGL (commercially available from Clariant); Ink Jet Yellow 4G VP2532 (commercially available from Clariant); Toner Yellow HG (commercially available from Clariant); Lumogen® Yellow D0790 (commercially available from BASF); Suco-Yellow L1250 (commercially available from BASF); Suco-Yellow D1355 (commercially available from BASF); Suco Fast Yellow D1 355, D1 351 (commercially available from BASF); HOSTAPERM® Pink E 02 (commercially available from Clariant); Hansa Brilliant Yellow 5GX03 (commercially available from Clariant); Permanent Yellow GRL 02 (commercially available from Clariant); Permanent Rubine L6B 05 (commercially available from Clariant); FANAL® Pink D4830 (commercially available from BASF); CINQUASIA® Magenta (commercially available from DU PONT); PALIOGEN® Black L0084 (commercially available from BASF); Pigment Black K801 (commercially available from BASF); and carbon blacks such as REGAL® 330 (commercially available from Cabot), Nipex® 150 (commercially available from Degussa) Carbon Black 5250 and Carbon Black 5750 (commercially available from Columbia Chemical), and the like, as well as mixtures thereof.

The pigment can be provided in the phase change ink composition in any suitable or desired amount. In embodiments, the pigment can be present in an amount of from about 0.1 to about 20 percent, or from about 0.5 percent to about 5 percent, or about 0.75 to about 3 percent total pigment, based on the total weight of the phase change ink composition.

Synergist.

The phase change ink compositions here in optionally further comprise a synergist. Any suitable or desired synergist can be employed. In embodiments, a copper phthalocyanine derivative is employed as a synergist for improving dispersion stability of pigmented phase change inks.

Dispersant.

The phase change ink compositions herein can contain a dispersant. Any suitable or desired dispersant can be employed. In embodiments, the dispersant can be a dispersant described in U.S. Pat. No. 7,973,186 of Adela Goredema, et al., which is hereby incorporated by reference herein in its entirety. In specific embodiments, the dispersant is a compound of the formula

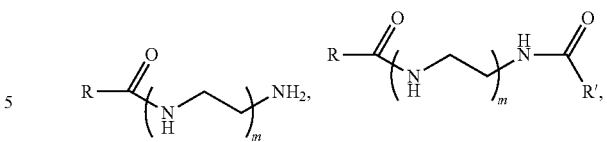

or a mixture thereof; wherein R and R' are the same or different, and wherein R and R' are independently selected from a linear alkyl group having about 37 carbon atoms and a linear alkyl group having about 47 carbon atoms; and wherein m is an integer of from about 1 to about 30.

The dispersant can optionally be a polymeric dispersant such as those sold under the name Solsperse®, in embodiments, Solsperse® 1700, Solsperse® 32000, Solsperse® 13240, available from The Lubrizol Corporation.

The dispersant can be provided in the phase change ink composition in any suitable or desired amount. In embodiments, the dispersant can be present in an amount of from about 1 to about 500 percent, or from about 10 to about 300 percent, or from about 30 to about 200 percent total dispersant, based on the total weight of the pigment in the phase change ink composition.

Other Additives.

The ink may further include conventional additives to take advantage of the known functionality associated with such conventional additives. Such additives may include, for example, at least one antioxidant, defoamer, slip and leveling agents, clarifier, viscosity modifier, adhesive, plasticizer and the like.

The ink may optionally contain antioxidants to protect the images from oxidation and also may protect the ink components from oxidation while existing as a heated melt in the ink reservoir. Examples of suitable antioxidants include N,N'-hexamethylene bis(3,5-di-tert-butyl-4-hydroxy hydrocinnamamide) (IRGANOX® 1098, available from BASF); 2,2-bis(4-(2-(3,5-di-tert-butyl-4-hydroxyhydrocinnamoyloxy)) ethoxyphenyl)propane (TOPANOL-205, available from Vertellus); tris(4-tert-butyl-3-hydroxy-2,6-dimethyl benzyl)isocyanurate (Aldrich); 2,2'-ethylidene bis(4,6-di-tert-butylphenyl)fluoro phosphonite (ETHANOX® 398, available from Albemarle Corporation); tetrakis(2,4-di-tert-butylphenyl)-4,4'-biphenyl diphosphonite (Aldrich); pentaerythritol tetrastearate (TCI America); tributylammonium hypophosphite (Aldrich); 2,6-di-tert-butyl-4-methoxyphenol (Aldrich); 2,4-di-tert-butyl-6-(4-methoxybenzyl)phenol (Aldrich); 4-bromo-2,6-dimethylphenol (Aldrich); 4-bromo-3,5-didimethylphenol (Aldrich); 4-bromo-2-nitrophenol (Aldrich); 4-(diethyl aminomethyl)-2,5-dimethylphenol (Aldrich); 3-dimethylaminophenol (Aldrich); 2-amino-4-tert-amylphenol (Aldrich); 2,6-bis(hydroxymethyl)-p-cresol (Aldrich); 2,2'-methylenediphenol (Aldrich); 5-(diethylamino)-2-nitrosophenol (Aldrich); 2,6-dichloro-4-fluorophenol (Aldrich); 2,6-dibromo fluoro phenol (Aldrich); α-trifluoro-o-cresol (Aldrich); 2-bromo-4-fluorophenol (Aldrich); 4-fluorophenol (Aldrich); 4-chlorophenyl-2-chloro-1,1,2-trifluoroethyl sulfone (Aldrich); 3,4-difluoro phenylacetic acid (Adrich); 3-fluorophenylacetic acid (Aldrich); 3,5-difluoro phenylacetic acid (Aldrich); 2-fluorophenylacetic acid (Aldrich); 2,5-bis(trifluoromethyl) benzoic acid (Aldrich); ethyl-2-(4-(4-(trifluoromethyl)phenoxy)phenoxy)propionate (Aldrich); tetrakis(2,4-di-tert-butyl phenyl)-4,4'-biphenyl diphosphonite (Aldrich); 4-tert-amyl phenol (Aldrich); 3-(2H-benzotriazol-2-yl)-4-hydroxy phenethylalcohol (Aldrich); NAUGARD® 76, NAUGARD® 445, NAUGARD® 512, and NAUGARD® 524 (manufactured by Chemtura Corporation); and the like, as well as mixtures thereof. The antioxidant, when present, may be present in the ink in any desired or effective amount, such as from about 0.25 percent to about 10 percent by weight of the ink or from about 1 percent to about 5 percent by weight of the ink.

The phase ink compositions of the present disclosure can be prepared by any desired or suitable method. In embodiments, a method for preparing a phase change ink composition herein comprises combining an amorphous compound; a crystalline compound; a polyester; a colorant; an optional synergist; and an optional dispersant; to produce a phase change ink composition.

For example, the ink ingredients can be mixed together, followed by heating, to a temperature of at least about 100° C. to no more than about 140° C., although the temperature can be outside of this range, and stirring until a homogeneous ink composition is obtained, followed by cooling the ink to ambient temperature (typically from about 20 to about 25° C.). The inks of the present disclosure are solid at ambient temperature. In a specific embodiment, during the formation process, the inks in their molten state are poured into molds and then allowed to cool and solidify to form ink sticks.

In embodiments, an ink jet printer stick or pellet herein contains a phase change ink composition comprising an amorphous compound; a crystalline compound; a polyester; an optional dispersant; an optional fluorescent dye; and a colorant.

The inks disclosed herein can be employed in apparatus for direct printing ink jet processes and in indirect (offset) printing ink jet applications. Another embodiment is directed to a process which comprises incorporating an ink as disclosed herein into an ink jet printing apparatus, melting the ink, and causing droplets of the melted ink to be ejected in an imagewise pattern onto a recording substrate. A direct printing process is also disclosed in, for example, U.S. Pat. No. 5,195,430, the disclosure of which is totally incorporated herein by reference. The inks prepared as disclosed herein can be employed in apparatus for indirect (offset) printing ink jet applications. Another embodiment is directed to a process which comprises incorporating an ink prepared as disclosed herein into an ink jet printing apparatus, melting the ink, causing droplets of the melted ink to be ejected in an imagewise pattern onto an intermediate transfer member, and transferring the ink in the imagewise pattern from the intermediate transfer member to a final recording substrate. In a specific embodiment, the intermediate transfer member is heated to a temperature above that of the final recording sheet and below that of the melted ink in the printing apparatus. An offset or indirect printing process is also disclosed in, for example, U.S. Pat. No. 5,389,958, the disclosure of which is totally incorporated herein by reference. In one specific embodiment, the printing apparatus employs a piezoelectric printing process wherein droplets of the ink are caused to be ejected in imagewise pattern by oscillations of piezoelectric vibrating elements.

In embodiments, a method herein comprises incorporating into an ink jet printing apparatus a phase change ink composition as described herein; melting the ink composition; and causing droplets of the melted ink to be ejected in an imagewise pattern onto a substrate.

Ink jetting temperature can be any suitable or desired jetting temperature, in embodiments, jetting temperature being from about 50° C. to about 140° C. or more typically from about 100° C. to about 140° C. The ink compositions generally have melt viscosities at the jetting temperature (in one embodiment no lower than about 50° C., in another embodiment no lower than about 60° C., and in yet another embodiment no lower than about 70° C., and in one embodiment no higher than about 120° C., and in another embodiment no higher than about 110° C., although the jetting temperature can be outside of these ranges) in one embodiment of no more than about 30 centipoise, in another embodiment of no more than about 20 centipoise, and in yet another embodiment of no more than about 15 centipoise, and in one embodiment of no less than about 2 centipoise, in another embodiment of no less than about 5 centipoise, and in yet another embodiment of no less than about 7 centipoise, in another embodiment, of greater than about $10^5$ centipoise at a temperature of less than about 40° C., in another embodiment, of less than about 15 centipoise at a temperature of no less than about 70° C., although the melt viscosity can be outside of these ranges.

In one specific embodiment, the inks are jetted at low temperatures, in particular at temperatures below about 110° C., in one embodiment from about 40° C. to about 110° C., in another embodiment from about 50° C. to about 110° C., and in yet another embodiment from about 60° C. to about 90° C., although the jetting temperature can be outside of these ranges.

Any suitable substrate or recording sheet can be employed, including plain papers such as XEROX® 4024 papers, XEROX® Image Series papers, Courtland 4024 DP paper, ruled notebook paper, bond paper, silica coated papers such as Sharp Company silica coated paper, JuJo paper, HAMMERMILL LASERPRINT® paper, and the like, transparency materials, fabrics, textile products, plastics, polymeric films, inorganic substrates such as metals and wood, and the like.

EXAMPLES

The following Examples are being submitted to further define various species of the present disclosure. These Examples are intended to be illustrative only and are not intended to limit the scope of the present disclosure. Also, parts and percentages are by weight unless otherwise indicated.

TABLE 1

|   | Reactant | MW | Eq | Moles | Reactant Mass |
|---|----------|-----|------|-------|---------------|
| 1 | Dymerex ™ | 487 | 0.15 | 0.500 mol | 244 g |
| 2 | NDC | 244.24 | 0.12 | 0.400 mol | 98 g |
| 3 | propylene glycol | 76.1 | 0.2 | 0.667 mol | 51 g (Excess) |
| 4 | propylene glycol | 76.1 | 0.3 | 1.000 mol | 76 g |
| 5 | 1,3-propanediol | 76.09 | 0.2 | 0.667 mol | 51 g |
| 6 | azelaic acid | 188.22 | 0.21 | 0.700 mol | 132 g |
| 7 | Fascat ® 4100 | 208.8 | 0.00195 | 6.50 mmol | 1.357 g |
| 8 | Vertec ® AC422 | 280 | 0.0015 | 5.00 mmol | 1.400 g |
| 9 | Rosin Acrylate | 353.6 | 0.02 | 0.067 mol | 24 g (Step 2) |

Example 1

Synthesis of bio-based polyester resin. A bio-based polyester resin was prepared having the components as set forth in Table 1 as follows. A 1 Liter Parr reactor equipped with a mechanical stirrer, bottom drain valve and distillation apparatus, was charged with Dymerex™, dimerized rosin composed predominately of dimeric acids derived from rosin with lesser amounts of monomeric resin acids and neutral materials of rosin origin available from Eastman Chemical Company, (244 grams, 0.50 moles, 0.15 equivalent (eq.)), 1,2- propylene glycol obtained from Sigma-Aldrich® (127 grams, 1.667 moles, 0.50 eq.; of which excess 0.2 eq.), naphthalene dicarboxylic acid (NDC) obtained from Sigma-Aldrich® (98 grams, 0.40 moles, 0.12 eq.), 1,3-propanediol obtained from Sigma-Aldrich® (151 grams, 0.667 moles, 0.20 eq.), azelaic acid obtained from City Chemicals LLC (132 grams, 0.70 moles, 0.21 eq.) followed by 1.4 grams of both Fascat® 4100 available from Arkema, Inc. and Vertec® AC422 titanium catalyst commercially available from Johnson Matthey Catalysts. The reactor was blanketed with nitrogen and the temperature of the reactor was slowly raised to 170° C. with stirring (once the solids melted). This reaction mixture was maintained for 16 hours under nitrogen at 200° C. while methanol was continuously collected in a collection flask. The reaction mixture was heated to 205° C. and low vacuum was applied. The vacuum was switched to a higher vacuum (<0.1 Torr). During this time, ethylene glycol distilled off and when the softening point of the resin reached 100° C., the reactor temperature was reduced to 180° C. and the second portion of rosin fumarate (Rosin-FA available from Harima Chemical, Japan) 24 grams, 0.067 moles, 0.02 eq.) was added. The reaction mixture temperature was slowly raised to 230° C. while under high vacuum for another 5 hours until a softening point of 100.6° C. was achieved. The temperature was then lowered to 195° C. and the polymer was discharged onto a polytetrafluoroethylene (Teflon®) pan. The bio-based polyester resin was characterized and determined to have a C/O [carbon to oxygen ratio] of 5.69, a biomass content of 86.5 percent, a softening temperature of 100.6° C., an onset glass transition temperature of 13.2° C., an A.V. [acid value] of 10.9, a Molecular Number of 2,378, and a Molecular Weight of 5,250.

Example 2

TABLE 2

|   | Reactant | Limit? | MW | Eq | Moles (mmol) | Reactant Mass (g) |
|---|----------|--------|------|------|------|-------|
| 1 | glycerol | ☑ | 92.09 | 0.36 | 710 | 65.4 |
| 2 | NDC | ☐ | 244.24 | 0.18 | 355 | 87 |
| 3 | abietic acid | ☐ | 302.45 | 0.46 | 907 | 274 |
| 4 | Fascat ® 4100 | ☐ | 208.83 | 0.0025 | 5.0 | 1.044 |
| 5 | Vertec ® AC422 | ☐ | 280 | 0.0019 | 3.8 | 1.064 |

Synthesis of bio-based polyester resin. A bio-based polyester resin was prepared according to the following reaction scheme

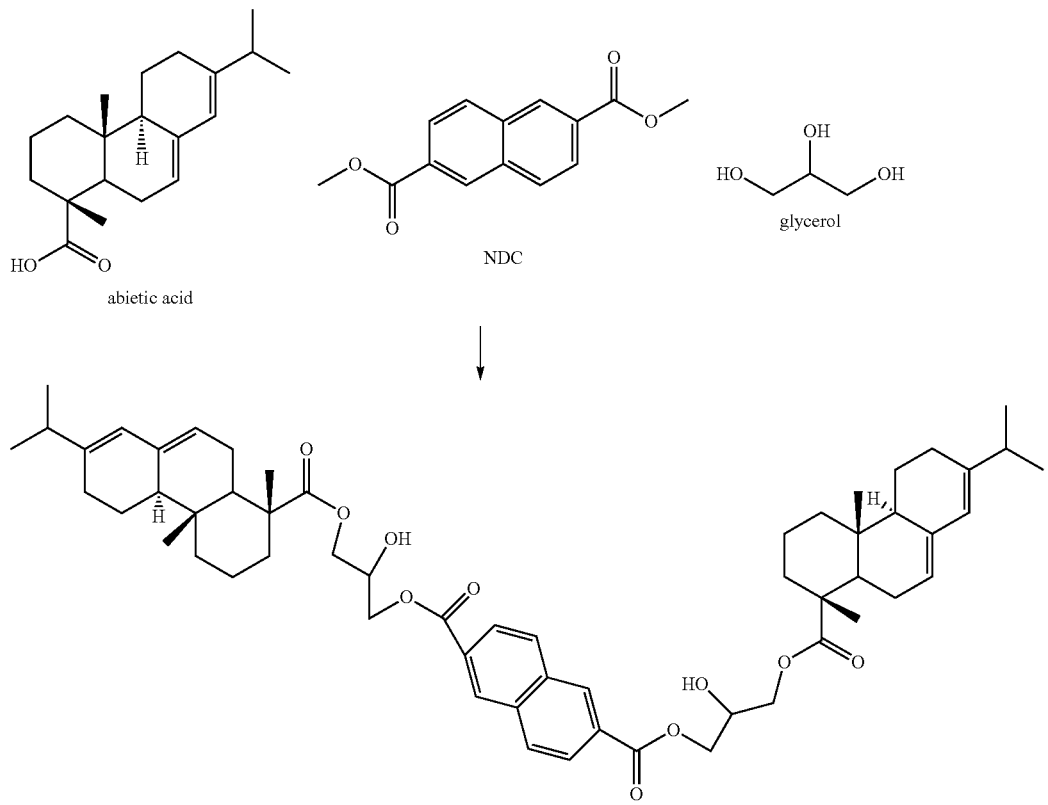

Synthesis of rosin-glycerol-NDC added

Molecular Weight 933.22 and having the components as set forth in Table 2 as follows. Into a 1 Liter Parr reactor equipped with a mechanical stirrer, bottom drain valve and distillation apparatus, were added 274 grams of 70% purity abietic acid (907 mmol; 0.46 equivalent weight), 65.4 grams of 99.5% glycerol (710 mmol; 0.36 equivalent weight) and 1.044 grams Fascat® 4100 catalyst and 1.064 grams Vertec® AC422 titanium catalyst. The contents of the reactor were heated with stirring under nitrogen. The temperature was gradually increased to 225° C. and held there for 4 to 5 hours.

TABLE 3

| | Reactant | MW | Eq | Moles (mmol) | Reactant Mass (g) |
|---|---|---|---|---|---|
| 1 | rosin acid-diol monomer | 919.19 | 0.25 | 79.4 | 73.0 |
| 2 | 1,6 hexanediol | 118.18 | 0.43 | 137 | 16.14 |
| 3 | isophthalic acid | 166.14 | 0.32 | 102 | 16.89 |
| 4 | Fascat 4100 | 208.83 | 0.002 | 0.635 | 0.133 |

Once the esterified product was formed, Example 2 continued having the components as set forth in Table 3 as follows. 16.89 grams of isophthalic acid (102 mmol; 0.32 equivalent weight), 16.14 grams of 1,6-hexanediol (137 mmol; 0.43 equivalent weight) and 0.33 grams Fascat® 4100 catalyst was added to flask and heating at 220° C. continued for 14 hours until the softening point (Ts) of the resin reached 93.8° C. The Ts of the resin was determined by the Mettler FP 800 Thermosystem consisting of FP80 Central Processor and FP83 Dropping Cell. The temperature was programmed to increase at 1° C./minute until the target Ts was reached. The bio-based polyester resin of Example 2 was characterized and determined to have a C/O of 5.23, a biomass content of 57.7 percent, a softening temperature of 93.8° C., an onset glass transition temperature of 35.6° C., an A.V. of 7.70, a Molecular Number of 1,321, and a Molecular Weight of 3,389.

Example 3

Synthesis of bio-based polyester resin. A poly(mandelic acid-co-lactic acid) copolymer was prepared as follows. A 250 milliliter round bottom flask was charged with DL-mandelic acid obtained from Sigma-Aldrich® (533 mmol, 0.40 eq., 81.0 grams) and lactic acid obtained from Sigma-Aldrich® (800 mmol, 0.6 eq., 72.1 grams). The flask was fitted with an overhead stirrer, heating mantle, nitrogen line, condenser and Dean-Stark trap. The monomer mixture was heated to 200° C. for 20 hours. Water formed during the condensation polymerization and was collected in the trap. Once the softening point reached about 90° C., the polymer was discharged from the flask. The bio-based polyester resin of Example 3 was characterized and determined to have a biomass content of 60 percent, a softening temperature of 90.0° C., an onset glass transition temperature of 33.2° C., an A.V. of 83.6, a Molecular Number of 1,276, and a Molecular Weight of 738.

Examples 4, 5, and 6

Three inks were prepared having formulations as shown in Table 4 comprising dibenzyl hexane-1,6-diyldicarbamate (polyurethane) with a derivative of L-tartaric acid/cyclohexanol/tert-butyl cyclohexanol (TBCT) made by the following procedure. In a 500 milliliter flask, equipped with a Dean-Stark trap, L-tartaric acid (40.0 grams, 267 mmol), cyclohexanol (26.7 grams, 267 mmol), 4-(tert-butyl)cyclohexanol (41.6 grams, 267 mmol), and Xylene (Volume: 250 milliliters) were added to give a suspension. P-toluenesulfonic acid monohydrate (1.014 grams, 5.33 mmol) was added and the mixture was refluxed (oil bath temp at 175° C. with aluminum foil cover over oil bath). After 5 hours, about 10.0 milliliters of water was collected (theo: 9.6 milliliters) and cooled to room temperature (slightly brown). This was then purified to obtain the TBCT mixture). Cyan colorant comprising Pigment Blue (BG4) obtained from Clariant was dispersed with the bio-based polyesters of Examples 1 through 3. The inks were prepared by mixing polyurethane with a TBCT-cyan dispersion and the bio-based polyesters of Examples 1, 2, and 3. Thus, to a heated beaker (140° C.) was added polyurethane (melted in oven). While stirring the polyester was added, followed by the cyan dispersion in TBCT. This was stirred for 1 hour and then filtered thru a 1 µm filter paper to give the desired ink.

TABLE 4

| Example | Polyurethane | Polyester | TBCT Dispersion |
|---|---|---|---|
| 4 | 15.2 grams | Example 1 2.21 grams | 2.67 grams |
| 5 | 15.2 grams | Example 2 2.21 grams | 2.67 grams |
| 6 | 15.2 grams | Example 3 2.21 grams | 2.67 grams |

Comparative Example 7

The comparative ink of Example 7 was prepared by combining distearyl terephthalate (DST) (6.75 grams, 67.5 weight %), a derivative of L-tartaric acid/cyclohexanol/tert-butyl cyclohexanol (TBCT) (1.91 grams, 19.1 weight %), and a cyan pigment concentrate in DST (1.33 grams, 15 weight % cyan pigment in DST) and stiffing at 140° C. for 1 hour.

Comparative Example 8

The comparative ink of Example 8 was prepared by combining dibenzyl hexane-1,6-diyldicarbamate (497.1 grams, 76.5 weight %), di-DL-menthyl L-tartrate (DMT) (22.88 grams, 3.52 weight %) and a cyan pigment dispersion (130 grams, 10 weight % cyan pigment in DMT), heating to 140° C. and homogenizing for 30 minutes.

Comparative Example 9

The comparative ink of Example 9 is a commercially available solid ink sold as Toner Pearls ink for use in the Océ ColorWave 600 printer by Océ (now owned by Canon).
Rheology.
The rheology of the inks of Examples 4, 5, and 6 were tested using an ARES G2 Rheometer. FIG. 1 shows that at jetting temperatures of 130° C., the viscosities of the inks of Examples 4, 5, and 6 are in the jettable range. In embodiments, the polyester molecular weight can be optimized to reduce the viscosity depending on the molecular weight and overall ink composition.
A=Ink Example 4
B=Ink Example 5
C=Ink Example 6
Ink Print-Proofing and Robustness Testing.
K-proof samples of the Inks of Examples 4, 5, and 6 and Comparative Examples 7, 8, 9, and 10 were made on coated paper (DCEG: Xerox® Digital Color Elite Gloss, 120 gsm). The K-proofs were spread by feeding each K-proof through a Xerox Phaser® 8400 or Phaser® 8860 printer at 1 inch per second at a drum and paper pre-heat temperature of 50° C. with the ink-surface facing the transfix drum. One K-proof of each ink was then scratched using the XRCC three-finger gouge system, and another K-proof folded along with a Xerox Business 4200 (75 gsm) facing page in a Duplo D-590 folder and evaluated for fold crease. A third K-proof was spread at increasing spreader drum and pre-heat temperatures until offset became apparent (spreader offset can be a limiting factor in what temperature certain print-process steps can be carried out, higher temperatures are better).

One K-proof of each ink spread at 50° C. was visually assessed for scratch and fold crease area. Results are shown in Table 5. The inks of the present disclosure exhibit significant improvement in fold crease and scratch over comparative inks.

TABLE 5

|  | Fold Offset | | | |
| --- | --- | --- | --- | --- |
|  | Rank Order | SIR Grade | Fold Crease Rank Order | Scratch Rank Order |
| Ink Example 4 | 2 | 1.5 | 3 | 2 |
| Ink Example 5 | 5 | 2 | 2 | 3 |
| Ink Example 6 | 3 | 1.5 | 4 | 4 |
| Comparative Ink Example 7 | 4 | 2 | 5 | 5 |
| Comparative Ink Example 8 | 6 | 2 | 6 | 6 |
| Comparative Ink Example 9 | 1 | 1 | 1 | 1 |

The inks of Examples 2, Comparative Example 9, Comparative Example 10, were tested for fold crease and fold offset as follows. The K-proof was folded along with a Xerox Business 4200 (gsm) facing page in a Formax® folder at 100% speed and evaluated for fold offset and fold crease. Evaluation was done by using SIR and comparing them with other commercially available inks. One K-proof of each ink was scratched using the XRCC three-finger gouge system. When a scratch/gouge finger with a curved tip at an angle of about 15° from vertical, with a weight of 528 g applied, was drawn across the images at a rate of approximately 13 mm/s no ink was visibly removed from the images. The scratch test uses a scratch/gouge tip similar to a lathe round nose cutting bit with radius of curvature of approximately 12 mm Evaluation was done by using SIR and comparing them to commercially available inks. K-proof analyses showed superior scratch resistance of Ink A and Ink B when compared to commercially available inks.

The bio-based polyester-containing ink of Example 2 exhibited superior performance as compared with the comparative inks. Results for Example 2 and Comparative Example 9 are provided in Table 6.

TABLE 6

| Example | K-Proof Mail Offset | K-Proof Fold Offset | Crock Cloth | Crock K-Proof | 3 Finger Scratch | Fold Offset | Fold Crease |
| --- | --- | --- | --- | --- | --- | --- | --- |
| Comparative Example 9 | 2.5 | 2 | 3 | 3 | 2 | 1 | 1.5 |
| Example 2 | 2 | 2.5 | 2 | 1 | 2.5 | 2 | 2 |
| Range | 2 | 1 | 3 | 4 | 3 | 1.5 | 3.5 |

In embodiments, the phase change ink compositions herein include a mixture of crystalline and amorphous materials. The crystalline materials impart a hardness and rapid phase change that is particularly advantageous for DTP (direct-to-paper) print architectures. The amorphous materials (typically a viscous, tacky material) provide enhanced adhesion to the substrate and plasticize the crystalline component to prevent embrittlement and cracking of the printed image. In embodiments, the crystalline and amorphous materials are comprised of small molecules. Small molecules when compared to polymeric materials do not have the same cohesive forces and thus can sometimes exhibit mail offset and mail smear. In embodiments, the phase change ink compositions herein further comprise polyesters of selected low molecular weight and low polydispersity which enable the inks to exhibit viscosities within a jettable range at ink jetting temperatures such as from about 100° C. to about 140° C.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

The invention claimed is:

1. A phase change ink composition comprising:
   an amorphous compound;
   a crystalline compound;
   a polyester polymer, wherein the polyester has a molecular weight of from about 500 to about 8,000 and a polydispersity index of from about 1.0 to about 8.0;
   an optional synergist;
   an optional dispersant; and
   a colorant.

2. The phase change ink composition of claim 1, wherein the polyester is comprised of large monomers prepared from monomers selected from the group consisting of 1,2-propylene glycol, naphthalene dicarboxylic acid, 1,3-propanediol, azelaic acid, abietic acid, glycerol, isophthalic acid, hexanediol, DL-mandelic acid, lactic acid, succinic acid, citric acid, and mixtures and combinations thereof.

3. The phase change ink composition of claim 1, wherein the polyester is a bio-based polyester selected from the group consisting of poly(dimerized rosin-co-1,2-propylene glycol-co-naphthalene dicarboxylic acid-co-1,3-propanediol-co-azelaic acid-co-rosin fumarate) copolymer, poly(2-(2-hydroxy-2-(((1R,4aR,4bR)-7-isopropyl-1,4a-dimethyl-1,2,3,4,4a,4b,5,6,10,10a-decahydrophenanthrene-1-carbonyl)oxy)ethyl) 6-(2-hydroxy-3-(((1R,4aR,4bR)-7-isopropyl-1,4a-dimethyl-1,2,3,4,4a,4b,5,6,10,10a-decahydrophenanthrene-1-carbonyl)oxy)propyl) naphthalene-2,6-dicarboxylate-co-isophthalic acid-co-1,6-hexanediol) co polymer, poly(mandelic acid-co-lactic acid) copolymer, and mixtures and combinations thereof.

4. The phase change ink composition of claim 1, wherein the polyester is a bio-based, branched polyester resin comprising:

(i) the condensation product of:
(a) a hydroxyl donor;
(b) a cyclic polyhydroxyl acceptor; and
(c) an optional catalyst, and
(ii) a polyacid,
wherein said bio-based, branched polyester resin is greater than about 90% bio-based.

5. The phase change ink composition of claim 1, wherein the polyester is a bio-based, branched polyester resin comprising:
(i) the condensation product of:
(a) a hydroxyl donor selected from the group consisting of glycerol, glycerol carbonate, trimethylolpropane, trimethylolethane and hexane triol;
(b) a cyclic polyhydroxyl acceptor selected from the group consisting of abietic acid, neoabietic acid, palustric acid, levopimaric acid, dihydroabietic acid, pimaric acid, isopimaric acid and combinations thereof;
(c) an optional catalyst; and
(ii) a polyacid selected from the group consisting of fumaric acid, maleic acid, succinic acid, itaconic acid, dodecylsuccinic acid, glutaric acid, adipic acid, pimelic acid, suberic acid, azelaic acid, dodecane diacid and combinations thereof; wherein said bio-based, branched polyester resin is greater than about 90% bio-based.

6. The phase change ink composition of claim 1, wherein the polyester is a bio-based, branched polyester resin comprising:
(i) the polycondensation product of:
(a) glycerine carbonate and/or glycerol; and
(b) a rosin acid selected from the group consisting of abietic acid, neoabietic acid, palustric acid, levopimaric acid, dihydroabietic acid, pimaric acid, isopimaric acid and combinations thereof; and
(ii) a polyacid selected from the group consisting of succinic acid, fumaric acid, maleic acid, itaconic acid, dodecylsuccinic acid, glutaric acid, adipic acid, pimelic acid, suberic acid and azelaic acid.

7. The phase change ink composition of claim 1, wherein the polyester is 1-decyl-12-methyl dodecanedioate of the formula

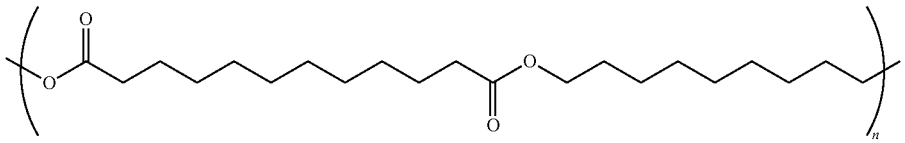

wherein n is an integer from 1 to 1,000.

8. The phase change ink composition of claim 1, wherein the polyester is polymer is a branched polyester comprising a compound of the formula:

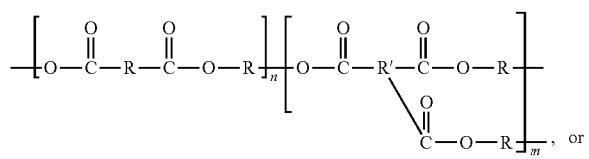

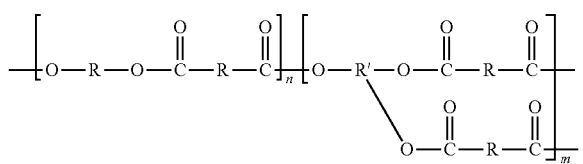

wherein R is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein R' is an alkylene group, and wherein the alkylene group can be selected from linear and branched, saturated and unsaturated, cyclic and acyclic, and substituted and unsubstituted alkylene groups, and wherein heteroatoms either may or may not be present in the alkylene group;

wherein all carbonyl carbons adjacent to R' are separated by at least two atoms if the two atoms are separated by a single bond; or wherein all carbonyl carbons adjacent to R' are separated by at least 3 atoms covalently linked in series;

wherein m is an integer from about 1 to about 1,000; and wherein n is an integer from about 1 to about 1,000.

9. The phase change ink of claim 1, wherein the amorphous compound comprises a first ester of tartaric acid of the formula

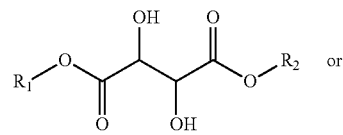

-continued

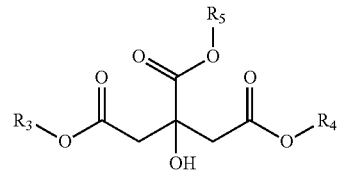

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and wherein the crystalline compound comprises a second ester of tartaric acid of the formula

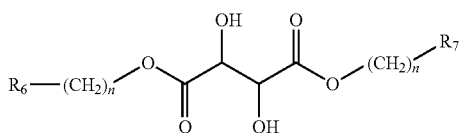

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3.

10. The phase change ink of claim 1, wherein the crystalline compound is selected from the group consisting of dibenzyl L-tartrate, diphenethyl L-tartrate, bis(3-phenyl-1-propyl) L-tartrate, bis(2-phenoxyethyl) L-tartrate, diphenyl L-tartrate, bis-4-methylphenyl) L-tartrate, bis(4-methoxylphenyl) L-tartrate, bis(4-methylbenzyl) L-tartrate, bis(4-methoxybenzyl) L-tartrate, and stereoisomers and mixtures thereof; and wherein the amorphous compound is selected from the group consisting of bis(2-isopropyl-5-methylcyclohexyl) L-tartrate, (4-t-butylcyclohexyl)(cyclohexyl)-L-tartrate, stereoisomers and mixtures thereof.

11. The phase change ink of claim 1, wherein the amorphous compound is a compound of the formula

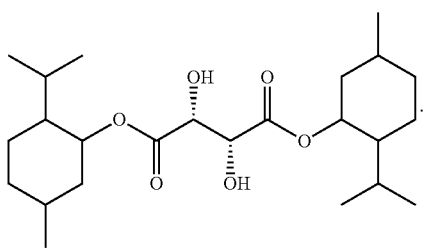 [SMILES: CC1CCC(C(C)C)C(OC(=O)[C@H](O)[C@@H](O)C(=O)OC2CC(C)CCC2C(C)C)C1]

12. The phase change ink of claim 1, wherein the crystalline compound is a compound of the formula

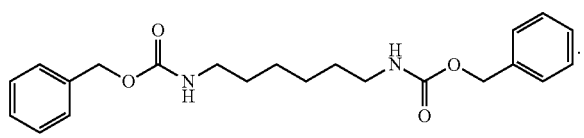 [SMILES: O=C(NCCCCCCNC(=O)OCc1ccccc1)OCc1ccccc1]

13. A process comprising:
 (1) incorporating into an ink jet printing apparatus a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant;
 (2) melting the ink; and
 (3) causing droplets of the melted ink to be ejected in an imagewise pattern onto a substrate.

14. The process of claim 13, wherein the polyester is a bio-based, branched polyester resin comprising:
 (i) the condensation product of:
  (a) a hydroxyl donor selected from the group consisting of glycerol, glycerol carbonate, trimethylolpropane, trimethylolethane and hexane triol;
  (b) a cyclic polyhydroxyl acceptor selected from the group consisting of abietic acid, neoabietic acid, palustric acid, levopimaric acid, dihydroabietic acid, pimaric acid, isopimaric acid and combinations thereof;
  (c) an optional catalyst; and
 (ii) a polyacid selected from the group consisting of fumaric acid, maleic acid, succinic acid, itaconic acid, dodecylsuccinic acid, glutaric acid, adipic acid, pimelic acid, suberic acid, azelaic acid, dodecane diacid and combinations thereof;
wherein said bio-based, branched polyester resin is greater than about 90% bio-based.

15. The process of claim 13, wherein the polyester wherein the polyester is 1-decyl-12-methyl dodecanedioate of the formula

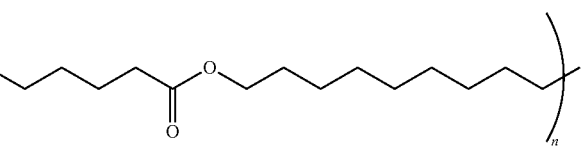

wherein n is an integer from 1 to 1,000.

16. An ink jet printer stick or pellet containing a phase change ink composition comprising an amorphous compound; a crystalline compound; a polyester polymer, wherein the polyester has a molecular weight of from about 500 to about 8,000 and a polydispersity index of from about 1.0 to about 8.0; an optional synergist; an optional dispersant; and a colorant.

17. The ink jet printer stick or pellet of claim 16, wherein the polyester is a bio-based, branched polyester resin comprising:
 (i) the condensation product of:
  (a) a hydroxyl donor selected from the group consisting of glycerol, glycerol carbonate, trimethylolpropane, trimethylolethane and hexane triol;
  (b) a cyclic polyhydroxyl acceptor selected from the group consisting of abietic acid, neoabietic acid, palustric acid, levopimaric acid, dihydroabietic acid, pimaric acid, isopimaric acid and combinations thereof;
  (c) an optional catalyst; and
 (ii) a polyacid selected from the group consisting of fumaric acid, maleic acid, succinic acid, itaconic acid, dodecylsuccinic acid, glutaric acid, adipic acid, pimelic acid, suberic acid, azelaic acid, dodecane diacid and combinations thereof;
wherein said bio-based, branched polyester resin is greater than about 90% bio-based.

18. The ink jet printer stick or pellet of claim 16, wherein the polyester wherein the polyester is 1-decyl-12-methyl dodecanedioate of the formula

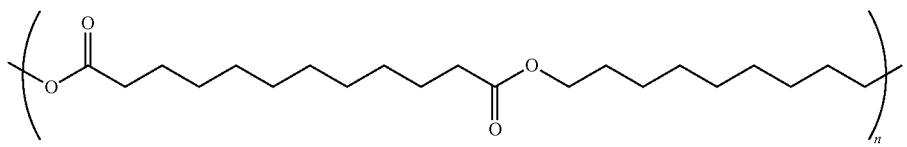

wherein n is an integer from 1 to 1,000.

19. The ink jet printer stick or pellet of claim 16, wherein the amorphous compound comprises a first ester of tartaric acid of the formula

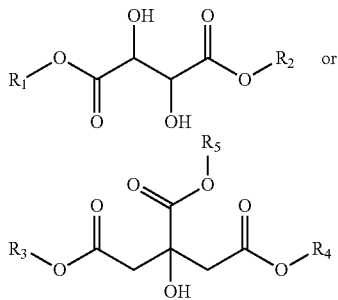

wherein each of $R_1$, $R_2$, $R_3$, $R_4$, and $R_5$ is independently selected from an alkyl group, wherein the alkyl is straight, branched or cyclic, saturated or unsaturated, substituted or unsubstituted, having from about 1 to about 40 carbon atoms, or a substituted or unsubstituted aromatic or heteroaromatic group; and wherein the crystalline compound comprises a second ester of tartaric acid of the formula

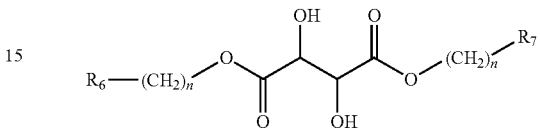

wherein each of $R_6$ and $R_7$ is independently selected from an aryl or a heteroaryl optionally substituted with a lower alkyl group, an alkoxy group, or a combination thereof, and wherein each n is independently selected from an integer from 0 to 3.

20. The ink jet printer stick or pellet of claim 16, wherein the polyester is wherein the polyester is comprised of large monomers prepared from monomers selected from the group consisting of 1,2-propylene glycol, naphthalene dicarboxylic acid, 1,3-propanediol, azelaic acid, abietic acid, glycerol, isophthalic acid, hexanediol, DL-mandelic acid, lactic acid, succinic acid, citric acid, and mixtures and combinations thereof.

* * * * *